United States Patent
Yokohata

(10) Patent No.: US 8,063,947 B2
(45) Date of Patent: Nov. 22, 2011

(54) IMAGE SHOOTING DEVICE

(75) Inventor: Masahiro Yokohata, Osaka (JP)

(73) Assignee: SANYO Electric Co., Ltd., Moriguchi (JP)

( * ) Notice: Subject to any disclaimer, the term of this patent is extended or adjusted under 35 U.S.C. 154(b) by 342 days.

(21) Appl. No.: 12/500,788

(22) Filed: Jul. 10, 2009

(65) Prior Publication Data

US 2010/0007763 A1 Jan. 14, 2010

(30) Foreign Application Priority Data

Jul. 14, 2008 (JP) .................................. 2008-182824

(51) Int. Cl.
*H04N 5/228* (2006.01)
*H04N 5/76* (2006.01)

(52) U.S. Cl. ................... 348/222.1; 348/231.6; 382/118
(58) Field of Classification Search ................ 348/352, 348/345, 231.6, 222.1
See application file for complete search history.

(56) References Cited

U.S. PATENT DOCUMENTS

| | | | | |
|---|---|---|---|---|
| 2009/0009652 A1* | 1/2009 | Sudo et al. | ..................... | 348/349 |
| 2009/0135269 A1* | 5/2009 | Nozaki et al. | .............. | 348/222.1 |
| 2009/0233364 A1* | 9/2009 | Lim et al. | ..................... | 435/440 |
| 2010/0259639 A1* | 10/2010 | Hung et al. | ................ | 348/223.1 |
| 2011/0032378 A1* | 2/2011 | Kaneda | ........................ | 348/222.1 |
| 2011/0134273 A1* | 6/2011 | Mise et al. | ................. | 348/222.1 |

FOREIGN PATENT DOCUMENTS

| | | |
|---|---|---|
| JP | 8009227 | 1/1996 |
| JP | 2003107335 | 4/2003 |
| JP | 2004258907 | 9/2004 |

* cited by examiner

*Primary Examiner* — Hung Lam
(74) *Attorney, Agent, or Firm* — NDQ & M Watchstone LLP

(57) ABSTRACT

An image shooting device with an image sensing portion that acquires a series of input images formed in chronological order; a face detection portion that, detects a human face from each input image outputting position information of the detected face; a priority face choice portion that chooses a priority face from the detected faces; an identification portion that, searches for the priority face; and a re-choice portion that, when the priority face is detected from a first input image acquired but the priority face is not detected by the identification portion from a second input image retains information including position information executes a re-choice processing to re-choose the priority face searching within the third input image for a face to be re-chosen as a priority face.

6 Claims, 15 Drawing Sheets

| FACE NO. | POSITION | HISTORY FLAG | PRIORITY FACE FLAG | ADDITIONAL INFO. |
|---|---|---|---|---|
| 1 | (x1_1, y1_1), (x1_2, y1_2) | past | 0 | |
| 2 | (x2_1, y2_1), (x2_2, y2_2) | past | 1 | |
| 3 | (x3_1, y3_1), (x3_2, y3_2) | new | 0 | |

FIG.13A

| TIME POINT $t_1$ | FACE NO. | POSITION | HISTORY FLAG | PRIORITY FACE FLAG | ADDITIONAL INFO. |
|---|---|---|---|---|---|
| | 1 | | new | 0 | |
| | 2 | | new | 0 | |

FIG.13B

| TIME POINT $t_2$ | FACE NO. | POSITION | HISTORY FLAG | PRIORITY FACE FLAG | ADDITIONAL INFO. |
|---|---|---|---|---|---|
| | 1 | | past | 1 | |
| | 2 | | past | 0 | |

FIG.13C

| TIME POINT $t_{n-1}$ | FACE NO. | POSITION | HISTORY FLAG | PRIORITY FACE FLAG | ADDITIONAL INFO. |
|---|---|---|---|---|---|
| | 1 | | past | 1 | |
| | 2 | | past | 0 | |

FIG.13D

| TIME POINT $t_n$ | FACE NO. | POSITION | HISTORY FLAG | PRIORITY FACE FLAG | ADDITIONAL INFO. |
|---|---|---|---|---|---|
| | 1 | | | | |
| | 2 | | past | 0 | |

FIG.13E

| TIME POINT $t_{n+5}$ | FACE NO. | POSITION | HISTORY FLAG | PRIORITY FACE FLAG | ADDITIONAL INFO. |
|---|---|---|---|---|---|
| | 1 | | new | 1 | |
| | 2 | | past | 0 | |

FRONT-VIEW FACE

OBLIQUE-VIEW FACE

PROFILE

IMAGE SHOOTING DEVICE

This nonprovisional application claims priority under 35 U.S.C. §119(a) on Patent Application No. 2008-182824 filed in Japan on Jul. 14, 2008, the entire contents of which are hereby incorporated by reference.

BACKGROUND OF THE INVENTION

1. Field of the Invention

The present invention relates to image shooting devices such as digital still cameras and digital video cameras.

2. Description of Related Art

In digital still cameras and digital video cameras, processing for detecting a human face from a shot image has been put into practical use, and methods have been proposed for executing camera control and various application programs with the detected face taken as of interest. More than one face may be detected from a shot image, in which case one of those faces is chosen which is to be taken as of interest, and camera control and various application programs are executed with respect to the face of interest thus chosen. Such a face of interest is called a priority face.

For example, in a conventional digital camera furnished with a face detection function, when more than one face is detected from one shot image (still image), a priority face is chosen based on the distances of the faces on the shot image from its center and the sizes of the faces, and automatic focusing control is executed so that focus comes on the priority face.

In the case of a moving image, once a face is chosen as a priority face at a given time, as long as the face continues to be detected, that face needs to be kept recognized as the priority face. Accordingly, in a digital camera that performs camera control etc. with a priority face on a moving image taken as of interest, the priority face is followed up through face identification processing. Such identification processing is generally achieved based on the position information of a face on an image. Identification processing based on position information exploits the following principle: change in the position of a face on an image is continuous in the temporal direction.

Now, with reference to FIGS. 19A and 19B, identification processing based on position information will be described briefly. Consider a case where shooting at a first time point yielded an image 901 as shown in FIG. 19A and then shooting at a second time point yielded an image 902 as shown in FIG. 19B. The length of time between the first and second time points is, for example, equal to the frame period in moving image shooting. Through face detection processing on the images 901 and 902, face regions 911 and 921 are extracted from the image 901, and face regions 912 and 922 are extracted from the image 902. In this case, through identification processing based on position information, the positions of the face regions are compared between the images 901 and 902, and such face regions whose positions are close to each other are judged to contain an identical face, thereby achieving face identification. In the example shown in FIGS. 19A and 19B, the faces contained in the face regions 911 and 912 are judged to be identical, and the faces contained in the face regions 921 and 922 are judged to be identical.

A technology is also known that exploits face recognition technology to follow up a particular face. Inconveniently, however, face recognition technology requires complicated processing for extracting an individual's features from an image of his face to achieve the following-up of a particular face. By contrast, the above-described identification processing based solely on positional information allows the following-up of a particular face through simple processing, and is therefore helpful.

Indeed, a priority face can be followed up in the manner described above; however, for some cause, the face of interest to be grasped as the priority face may temporarily become undetectable. For example, when the face of interest happens to be located behind another subject, and thus out of the camera's view, that is, when the face of interest is shielded, as long as it is shielded, it cannot be detected. Conventional identification processing that can be executed in such a case will now be described with reference to FIGS. 20A, 20B, and 20C.

FIGS. 20A, 20B, and 20C show images 950, 960, and 970 obtained by shooting at first, second, and third time points respectively. It is assumed that the first, second, and third time points occur one after another in the this order. At the first, second, and third time points, two faces $FC_1$ and $FC_2$ are present inside the shooting region of a digital camera. Suppose that, with respect to the faces $FC_1$ and $FC_2$, face regions 951 and 952, respectively, are extracted from the image 950, and that the face $FC_1$ is chosen as the priority face at the first time point. In FIGS. 20A to 20C (and also in FIGS. 21A to 21C described later), faces enclosed in thick solid-lined frames are the priority face.

At the second time point, suppose that, as a result of movement of the subject, the face $FC_1$ is hidden behind the face $FC_2$, and thus the face $FC_1$ is not detected from the image 960 at the second time point. The reference sign 962 represents the face region of the face $FC_2$ extracted from the image 960. The position of the face region 962 is close to the position of the face region of the priority face (e.g., the position of the face region 951) on the shot image obtained immediately before the image 960. In addition, only one face region is detected from the image 960. Consequently, at the second time point, instead of the face $FC_1$, the face $FC_2$ corresponding to the face region 962 is recognized as the priority face.

As a result of movement of the subject thereafter, the faces $FC_1$ and $FC_2$ are detected from the image 970 at the third time point, and the face regions 971 and 972 of the faces $FC_1$ and $FC_2$ are extracted from the image 970. What should be noted here is that, although the face that the user takes as of interest is the face $FC_1$, since the priority face shifted from the face $FC_1$ to the face $FC_2$ at the second time point, through identification processing between the second and third time points, the priority face in the image 970 remains the face $FC_2$.

In the example corresponding to FIGS. 20A to 20C, the hiding of the face $FC_1$ behind the face $FC_2$ makes the face $FC_1$, which is to be taken as the priority face, temporarily undetectable. A similar phenomenon occurs also in a situation where the face $FC_1$ temporarily goes out of the shooting region (field of view) of the camera. A conventional method for choosing a priority face which can cope with such a situation will now be described with reference to FIGS. 21A to 21C.

FIGS. 21A, 21B, and 21C show images 950a, 960a, and 970a obtained by shooting at first, second, and third time points respectively. Suppose that, with respect to faces $FC_1$ and $FC_2$, face regions 951a and 952a, respectively, are extracted from the image 950a, and that the face $FC_1$ is chosen as the priority face at the first time point. As a result of, for example, movement of the face $FC_1$ between the first and second time points, if all or part of the face $FC_1$ goes out of the shooting region of the camera so much that the face $FC_1$ cannot be detected, the face $FC_1$ is not detected from the image 960a. At this time, if the face $FC_2$ is detected from the image 960a and the face region 962a of the face $FC_2$ is extracted, the camera chooses the face $FC_2$ anew as the priority face instead of the face $FC_1$. As a result of, for example, movement of the face $FC_1$ or panning of the camera thereafter, even if the faces $FC_1$ and $FC_2$ are detected from the image 970a at the third time point and their face regions 971a and 972a are extracted, through identification processing between the second and third time points, the priority face in the image 970a remains the face $FC_2$.

In this way, when a face of interest to be grasped as a priority face becomes temporarily undetectable, executing identification processing simply with the same conditions as when the face of interest has been detected may lead to another face—one different from the face of interest—being chosen as the priority face. This makes it impossible to continue camera control or the like with respect to the face of interest.

SUMMARY OF THE INVENTION

According to the invention, an image shooting device is provided with: an image sensing portion that, through repeated shooting, acquires a series of input images having a plurality of input images formed in chronological order; a face detection portion that, based on the image data of the series of input images, detects a human face from each input image and outputs position information representing the position of a detected face on the image; a priority face choice portion that chooses a priority face from one or more faces detected by the face detection portion; an identification portion that, based on the position information of the faces detected by the face detection portion, searches for the priority face in each input image to detect the priority face as distinguished from any other face; and a re-choice portion that, when the priority face is detected by the identification portion from a first input image acquired after choice of the priority face but the priority face is not detected by the identification portion from a second input image acquired after the first input image, retains retained information including position information of the priority face on the first input image, and then executes, by use of the retained information, re-choice processing to re-choose the priority face. Here, in the re-choice processing, based on the retained information and position information of a face on a third input image acquired after the second input image, the re-choice portion searches, within the third input image, for a to-be-re-chosen face to be re-chosen as a priority face anew under a condition different from the condition under which the identification portion searched for the priority face.

Specifically, for example, when two temporally consecutive input images from which the priority face is detected by the identification portion are fourth and fifth input images, with the fourth and fifth input images being acquired in this order, the identification portion sets, in the fifth input image, a first search range with reference to the position of the priority face on the fourth input image and searches, within the first search range, for the priority face on the fifth input image; on the other hand, the re-choice portion sets, in the third input image, a second search range with reference to the position of the priority face on the first input image and searches, within the second search range, the to-be-re-chosen face on the third input image. Here, the size of the second search range is larger than the size of the first search range.

For example, the re-choice portion inhibits a face other than the priority face detected from the first input image from being searched for as the to-be-re-chosen face.

More specifically, for example, the identification portion identifies faces detected by the face detection portion on a face-by-face basis based on position information of temporally consecutive input images including an input image of interest, through the identification, it is checked whether a face detected from the input image of interest is a face newly detected in the input image of interest or a face that has been detected in an input image previous to the input image of interest, and the re-choice portion performs the re-choice processing based on the result of the checking such that, of faces detected from the second search range on the third input image by the face detection portion, a face that was not detected from the second input image but that was newly detected in the third input image is searched for as the to-be-re-chosen face.

For example, there is additionally provided a movement detection portion that detects movement of a priority face between different input images, and the re-choice portion varies the shape of the second search range according to movement of the priority face during the period in which the priority face was being detected by the identification portion.

For example, the retained information includes additional information representing a feature of the priority face on the first input image, and the re-choice portion performs the re-choice processing based not only on position information of the priority face but on the additional information.

The significance and benefits of the invention will be clear from the following description of its embodiments. It should however be understood that these embodiments are merely examples of how the invention is implemented, and that the meanings of the terms used to describe the invention and its features are not limited to the specific ones in which they are used in the description of the embodiments.

BRIEF DESCRIPTION OF THE DRAWINGS

FIGS. 13A to 13E are diagrams showing the data contents in the face information management table at different time points corresponding to FIGS. 12A to 12E;

DETAILED DESCRIPTION OF PREFERRED EMBODIMENTS

Embodiments of the invention will be described specifically below with reference to the accompanying drawings. Among different drawings referred to, the same parts are identified by the same reference signs, and in principle no overlapping description of the same parts will be repeated.

Figure 1:
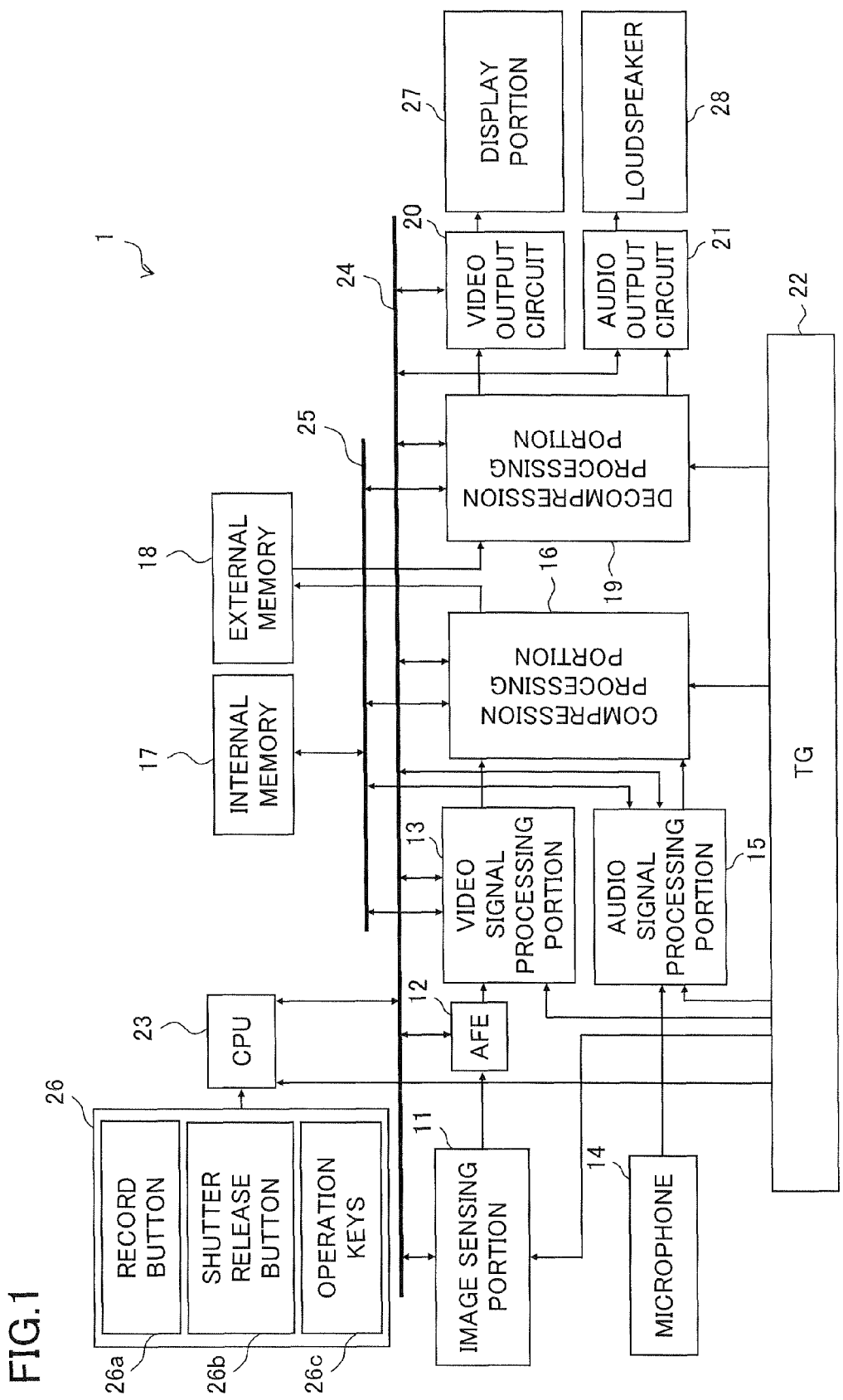
FIG. 1 is an overall block diagram of an image shooting device embodying the invention.

FIG. 1 is an overall block diagram of an image shooting device 1 embodying the invention. The image shooting device 1 is, for example, a digital video camera. The image shooting device 1 is capable of shooting both moving and still images, and is capable even of shooting a still image simultaneously while shooting a moving image.

Basic Configuration: The image shooting device 1 is provided with the following components: an image sensing portion 11; an AFE (analog front end) 12; a video signal processing portion 13; a microphone 14; an audio signal processing portion 15; a compression processing portion 16; an internal memory 17 such as a DRAM (dynamic random-access memory) or SDRAM (synchronous dynamic random-access memory); an external memory 18 such as an SD (Secure Digital) card or a magnetic disk; a decompression processing portion 19; a video output circuit 20; an audio output circuit 21; a TG (timing generator) 22; a CPU (central processing unit) 23; a bus 24; a bus 25; an operation portion 26; a display portion 27; and a loudspeaker 28. The operation portion 26 has a record button 26a, a shutter release button 26b, operation keys 26c, etc. The different blocks within the image shooting device 1 exchange signals (data) via the bus 24 or 25.

The TG 22 generates timing control signals for controlling the timing of different operations in the entire image shooting device 1, and feeds the generated timing control signals to different parts within the image shooting device 1. The timing control signals include a vertical synchronizing signal Vsync and a horizontal synchronizing signal Hsync. The CPU 23 controls the operation of different parts within the image shooting device 1 in a concentrated fashion. The operation portion 26 is operated by a user. How the operation portion 26 is operated is conveyed to the CPU 23. Different parts within the image shooting device 1 store various kinds of data (digital signals) in the internal memory 17 as necessary during signal processing.

Figure 2:
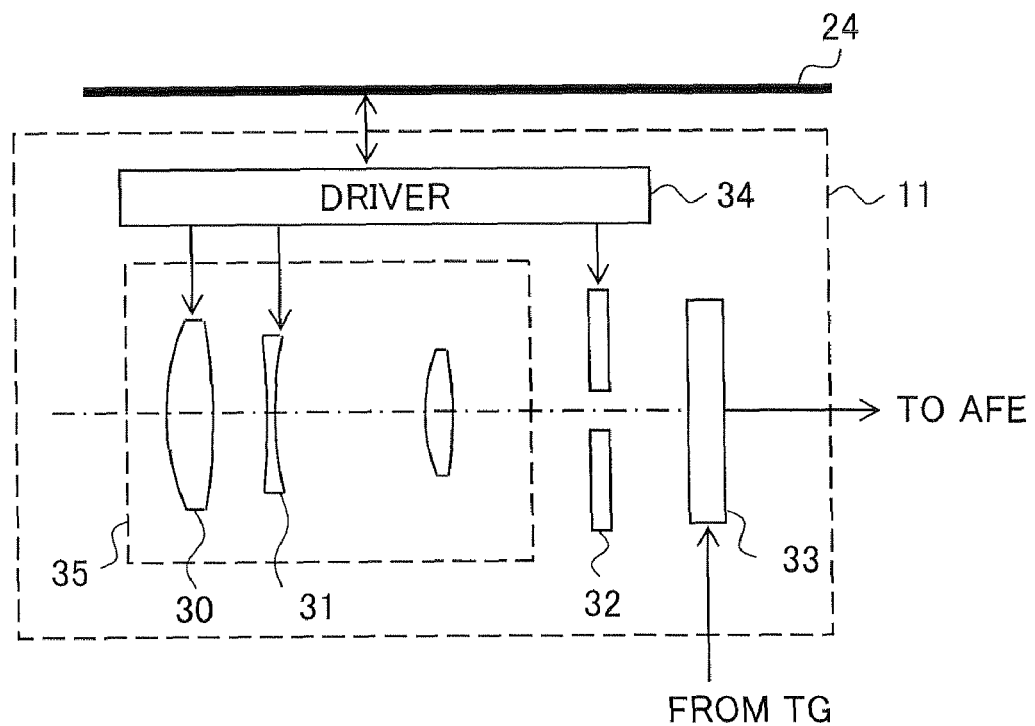
FIG. 2 is an internal configuration diagram of the image sensing portion in FIG. 1.

FIG. 2 is an internal configuration diagram of the image sensing portion 11 in FIG. 1. The image sensing portion 11 includes color filters or the like so that the image shooting device 1 can generate color images by shooting.

The image sensing portion 11 has an optical system 35, an aperture stop 32, an image sensor 33, and a driver 34. The optical system 35 is composed of a plurality of lenses including a zoom lens 30 and a focus lens 31. The zoom lens 30 and the focus lens 31 are movable along the optical axis.

Based on a control signal from the CPU 23, the driver 34 drives the zoom lens 30 and the focus lens 31 to control their positions, and drives the aperture stop 32 to control its aperture size; the driver 34 thereby controls the focal length (angle of view) and focus position of the image sensing portion 11 and the amount of light reaching the image sensor 33. The light from a subject is incident on the image sensor 33 by passing through the lenses composing the optical system 35 and through the aperture stop 32. The lenses composing the optical system 35 focus an optical image of the subject on the image sensor 33. The TG 22 generates drive pulses for driving the image sensor 33 in synchronism with the timing control signals mentioned above, and feeds the drive pulses to the image sensor 33.

The image sensor 33 is, for example, a solid-state image sensor such as CCD (charge-coupled device) or CMOS (complementary metal oxide semiconductor) image sensor. The image sensor 33 photoelectrically converts the optical image formed through the optical system 35 and the aperture stop 32, and outputs the resulting electrical signal to the AFE 12. More specifically, the image sensor 33 is provided with a plurality of light-receiving pixels arrayed in a two-dimensional matrix, each light-receiving pixel accumulating during each period of shooting an amount of signal charge commensurate with the time of exposure. Having magnitudes proportional to the amounts of signal charge accumulated respectively, the electrical signals from the individual light-receiving pixels are, in synchronism with the drive pulses from the TG 22, sequentially fed to the AFE 12 provided in the succeeding stage. Provided that the optical image formed through the optical system 35 remains the same and so does the aperture size of the aperture stop 32, the magnitude (intensity) of the electrical signals from the image sensor 33 increases proportionally with the exposure time mentioned above.

The AFE 12 amplifies the signals—analog signals—outputted from the image sensor 33, converts the amplified analog signals into digital signals, and then outputs the digital signals to the video signal processing portion 13. The amplification factor of the signal amplification by the AFE 12 is controlled by the CPU 23. The video signal processing portion 13 applies various kinds of image processing on the image represented by the output signals of the AFE 12, and generates a video signal representing the image having undergone the image processing. The video signal is composed of a luminance signal Y, which represents the luminance of the image, and color difference signals U and V, which represent the color of the image.

The microphone 14 converts the ambient sounds—the sounds around the image shooting device 1—into an analog audio signal. The audio signal processing portion 15 converts the analog audio signal into a digital audio signal.

The compression processing portion 16 compresses the video signal from the video signal processing portion 13 by a predetermined compression method. During shooting and recording of a moving or still image, the compressed video signal is recorded to the external memory 18. The compression processing portion 16 also compresses the audio signal from the audio signal processing portion 15 by a predetermined compression method. During shooting and recording of a moving image, the video signal from the video signal processing portion 13 and the audio signal from the audio signal processing portion 15 are compressed, while temporarily associated with each other, by the compression processing portion 16, so as to be recorded, in compressed form, to the external memory 18.

The record button 26a is a push button switch for commanding starting/ending of shooting and recording of a moving image. The shutter release button 26b is a push button switch for commanding shooting and recording of a still image.

The image shooting device 1 operates in different operation modes including shooting mode, in which it can shoot moving and still images, and playback mode, in which it plays back and displays on the display portion 27 moving and still images stored in the external memory 18. Different operation modes are switched by operation of the operation keys 26c. In shooting mode, shooting is performed sequentially at a predetermined frame period, and the image sensor 33 yields a series of chronologically ordered images. Each image composing this series of images is called a "frame image."

In shooting mode, when the user presses the record button 26a, under the control of the CPU 23, the video signal of one frame image after another obtained after the press is, along with the corresponding audio signal, sequentially recorded to the external memory 18 via the compression processing portion 16. After the start of moving image shooting, when the user presses the record button 26a again, recording of the video and audio signals to the external memory 18 is ended, and thus shooting of one moving image is completed. On the other hand, in shooting mode, when the user presses the shutter release button 26b, a still image is shot and recorded.

In playback mode, when the user operates the operation keys 26c in a predetermined manner, a compressed video signal stored in the external memory 18 representing a moving or still image is decompressed by the decompression processing portion 19 and is then fed to the video output circuit 20. Incidentally, in shooting mode, normally, regardless of how the record button 26a and the shutter release button 26b are operated, the video signal processing portion 13 keeps generating the video signal, which is fed to the video output circuit 20.

The video output circuit 20 converts the video signal fed to it—a digital video signal—into a video signal in a format displayable on the display portion 27 (e.g., an analog video signal), and then outputs the result. The display portion 27 is a display device including a liquid crystal display panel, an integrated circuit for driving it, etc., and displays an image according to the video signal outputted from the video output circuit 20.

During playback of a moving image in playback mode, also a compressed audio signal stored in the external memory 18 corresponding to the moving image is fed to the decompression processing portion 19. The decompression processing portion 19 decompresses the audio signal fed to it and feeds the result to the audio output circuit 21. The audio output circuit 21 converts the audio signal fed to it—a digital audio signal—into an audio signal in a format reproducible on the loudspeaker 28 (e.g., an analog audio signal), and outputs the result to the loudspeaker 28. The loudspeaker 28 outputs sounds to outside according to the audio signal from the audio output circuit 21.

The video signal from the video output circuit 20 and the audio signal from the audio output circuit 21 may instead be fed, via external output terminals (unillustrated) provided in the image shooting device 1, to an external device (such as an external display device).

Unless otherwise stated, the following description deals with the operation of the image shooting device 1 in shooting mode.

Figure 3:
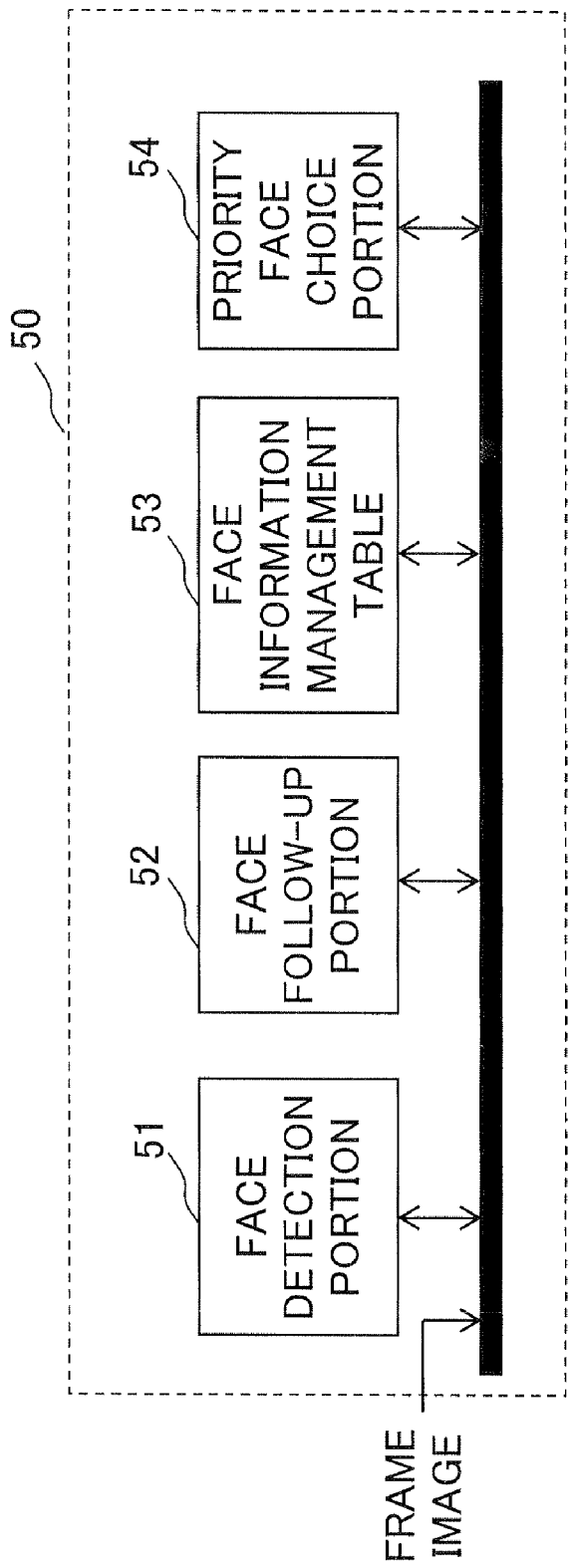
FIG. 3 is an internal block diagram of face processing blocks provided in the image shooting device of FIG. 1.

Configuration of Face Processing Blocks: The image shooting device 1 is furnished with a face detection function, and can exploit the face detection function to execute camera control and various application programs. FIG. 3 is a block diagram of part of the image shooting device 1 with special focus placed on the face detection function. Blocks identified by the reference signs 51-54 together constitute a face processing block 50, which is realized mainly by the video signal processing portion 13, the CPU 23, and the internal memory 17. For example, a face detection portion 51 is provided in the video signal processing portion 13; a face follow-up portion 52 and a priority face choice portion 54 are realized by the video signal processing portion 13, or by the CPU 23 and the video signal processing portion 13; a face information management table 53 is provided within the internal memory 17. Whenever necessary, any other block shown in FIG. 1 is involved for the realization of the functions of the blocks shown in FIG. 3.

The functions of the blocks shown in FIG. 3 will now be described. It is assumed that, as time passes, time points $t_1$, $t_2, \ldots, t_{n-1}, t_n, t_{n+1}, \ldots$ occur in this order (where n is an integer). The following description assumes that the length of time between adjacent time points $t_{n-1}$ and $t_n$ is equal to the frame period. Accordingly, the frame image obtained by shooting at time point $t_{n-1}$ and the frame image obtained by shooting at time point $t_n$ are two temporally consecutive frame images. The length of time between time points $t_{n-1}$ and $t_n$ may instead be made equal to an integer times (e.g., twice or three times) the frame period. In the following description, the frame image obtained by shooting at time point $t_n$ may also be called simply as the frame image at time point $t_n$ (the same applies to other time points $t_{n-1}$ etc. as well).

With respect to a given image, the data conveying information of the image is called its image data. With respect to a given image, both the image data of the image and the video signal of the image are information representing the image; thus the image data and the video signal can be grasped as equivalent.

The image data of a frame image is, as the image data of an input image to the face detection portion 51, fed to the face detection portion 51. Based on the image data of the input image fed to it, the face detection portion 51 detects a human face from the input image, and extracts a face region containing the detected face. Various techniques are known for detecting a face contained in an image, and the face detection portion 51 can adopt any of them.

Typically, for example, the image in a region of interest set within the input image is compared with a reference face image having a predetermined image size to evaluate the degree of similarity between the two images, and based on the degree of similarity a judgment is made as to whether or not a face is contained in the region of interest (whether or not the region of interest is a face region). In the input image, the region of interest is shifted one pixel at a time in the left/right or up/down direction. Then, the image in the so shifted region of interest is compared with the reference face image to evaluate the degree of similarity between the two images again, and a similar judgment is made. In this way, the region of interest is set anew every time it is shifted one pixel, for example, from the upper left to the lower right of the input image. Moreover, the input image is reduced by a given factor, and similar face detection processing is performed on the so reduced image. By repeating such processing, a face of any size can be detected from the input image.

The shape of a face region that the face detection portion 51 extracts from a frame image is rectangular (but may instead be other than rectangular). The face detection portion 51 extracts, from a frame image of interest, one or more face regions, and outputs face detection information including information identifying the position and size of each face region. The processing that the face detection portion 51 performs to find the position and size of a face region within a frame image is called face detection processing. Face detection processing can be performed for each frame image.

Based on the results of (i.e., face detection information obtained through) face detection processing performed for each frame image, the face follow-up portion 52 performs, for each face, face identification processing between temporally consecutive frame images, and, based on the results of face detection processing and identification processing, keeps the data in the face information management table 53 constantly updated. Through face identification processing, a judgment is made as to whether or not a face appearing in one frame image and a face appearing in another frame image are identical (whether or not they are the face of an identical person).

Figure 4A:
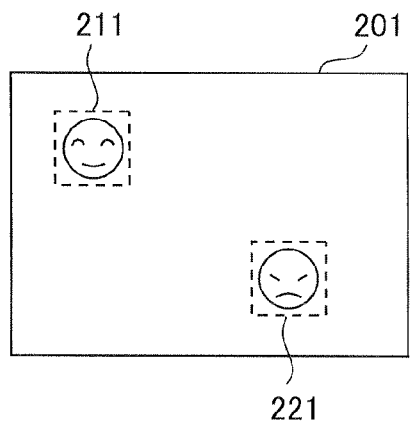
FIGS. 4A to 4C are diagrams illustrating identification processing executed by the face follow-up portion in FIG. 3.
Figure 4B:
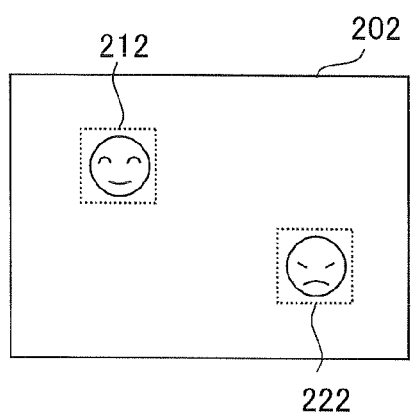
Figure 4C:
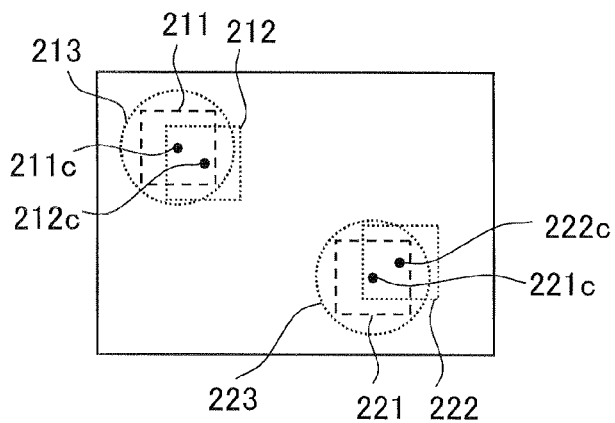

Face identification processing is performed on the following principle: change in the position of a face on an image in the temporal direction is continuous within a series of frame images. This will now be described more specifically with reference to FIGS. 4A to 4C. FIGS. 4A and 4B show images 201 and 202, which are an example of the frame images at time points $t_{n-1}$ and $t_n$ respectively. Rectangular regions 211 and 221 are face regions extracted from the image 201, and rectangular regions 212 and 222 are face regions extracted from the image 202. FIG. 4C shows all these face regions 211, 212, 221, and 222 as plotted on a common coordinate plane. Points 211c, 212c, 221c, and 222c represent the centers of the face regions 211, 212, 221, and 222 respectively.

The length of time between time points $t_{n-1}$ and $t_n$ is, for example, 1/60 or 1/30 seconds. Then, if the face regions 211 and 212 are ones with respect to an identical face, their positions are usually close to each other. Identification processing is executed based on the degree of closeness between those positions. The same applies to the face regions 221 and 222.

Specifically, the region inside a circle with a radius of $TH_1$ about the point 211c is defined as a search range 213, and a judgment is made as to whether or not the image 202 includes a face region whose center is located within the search range 213. If the image 202 includes such a face region, the face contained in that face region is judged to be identical with the face contained in the face region 211. In the example shown in FIGS. 4A to 4C, the center 212c of the face region 212 is located within the search range 213, and thus the face contained in the face region 212 and the face contained in the face region 211 are judged to be identical. On the other hand, the center 222c of the face region 222 is not located within the search range 213, and thus the face contained in the face region 222 and the face contained in the face region 211 are judged to be different.

Likewise, the region inside a circle with a radius of $TH_1$ about the point 221c is defined as a search range 223, and a judgment is made as to whether or not the image 202 includes a face region whose center is located within the search range 223. If the image 202 includes such a face region, the face contained in that face region is judged to be identical with the face contained in the face region 221. In the example shown in FIGS. 4A to 4C, the center 222c of the face region 222 is located within the search range 223, and thus the face contained in the face region 222 and the face contained in the face region 221 are judged to be identical. On the other hand, the center 212c of the face region 212 is not located within the search range 223, and thus the face contained in the face region 212 and the face contained in the face region 221 are judged to be different.

If, for the sake of argument, the image 202 includes more than one face region whose center is located within the search range 213, one possible approach is as follows: the distances from the center of each of those face regions to the center 211c are compared to identify that face region on the image 202 which corresponds to the shortest distance, and a judgment is made that the face contained in the so identified face region is identical with the face contained in the face region 211. The same applies to the search range 223.

$TH_1$ is a reference distance (as measured on the image) set for the checking of whether or not the face region of interest on the frame image at time point $t_{n-1}$ and the face region of interest on the frame image at time point $t_n$. The value of $TH_1$ can be set previously. The value of $TH_1$ may be varied according to the size of a face region.

Figure 5:
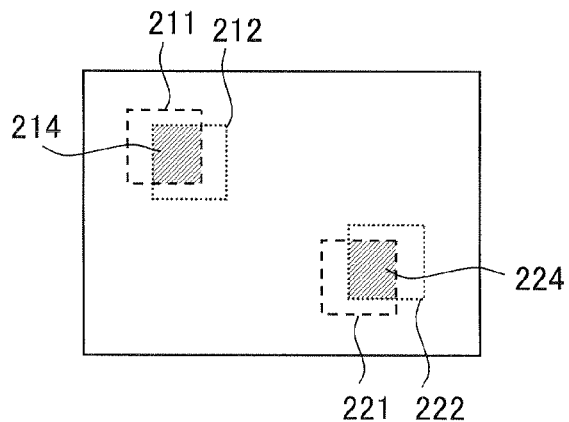
FIG. 5 is a diagram illustrating identification processing executed by the face follow-up portion in FIG. 3.

Alternatively, the area of the overlap between the face region of interest on the frame image at time point $t_{n-1}$ and the face region of interest on the frame image at time point $t_n$ may be calculated so that identification processing may be performed based on the so calculated area. In that case, for example, as shown in FIG. 5, the region 214 in which the face regions 211 and 212 overlap is identified, and the area of the overlap region 214 as measured on the image is calculated. Then the so calculated area is divided by the area of the face region 211 or 212 to find the quotient. If the quotient so found is equal to or more than a reference value, the faces contained in the face regions 211 and 212 are judged to be identical; otherwise, the faces contained in the face regions 211 and 212 are judged to be different. Likewise, with respect to the faces contained in the face regions 221 and 222, based on the area of the overlap region 224 between the face regions 221 and 222, similar processing is performed. The area of the overlap region 214 depends on the distance between the centers 211c an 212c, and therefore identification processing based on the area of the overlap region 214 may be said to be equivalent to the above-described identification processing based on center-to-center distance.

Through identification processing as described above, the face follow-up portion 52 checks if it can identify a face detected from a past frame image (e.g., the frame image at time point $t_{n-1}$) with a face detected from the current frame image (e.g., the frame image at time point $t_n$).

Figures 6, 7:
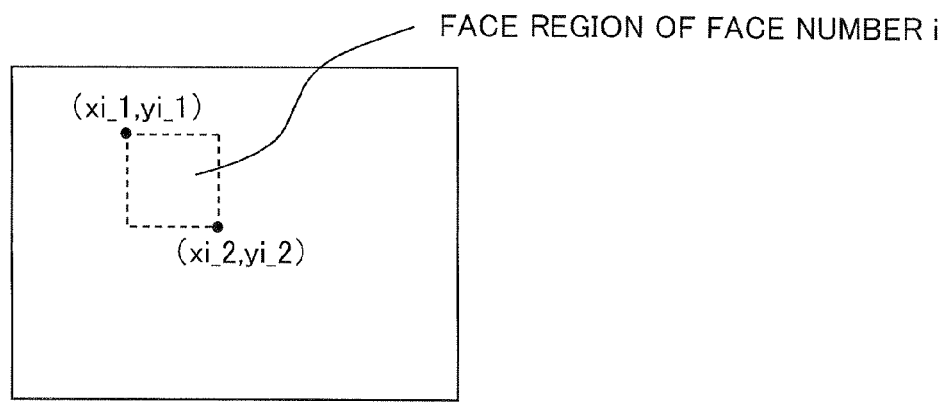
FIG. 6 is a diagram showing the data structure of the face information management table in FIG. 3.
FIG. 7 is a diagram showing the coordinates of a face region.

The results of face detection processing and identification processing are reflected in the data in the face information management table 53 (hereinafter also referred to simply as the table 53). FIG. 6 shows the data structure of the table 53. What FIG. 6 shows is the data structure of the table 53 as observed in a case where three faces—the faces of three different persons—have been detected. The three faces are assigned face numbers 1, 2, and 3, and for each face, data representing its face position, history flag, and priority face flag is, along with additional information, stored in the table 53. The position with respect to face number i is represented by (xi_1, yi_1) and (xi_2, yi_2). Here, i is a natural number, and in a case where face numbers 1 to 3 only are considered, i is 1, 2, or 3.

As shown in FIG. 7, (xi_1, yi_1) and (xi_2, yi_2) represent the coordinates (as measured on the image space) of the upper left and lower right corners of the face region with respect to face number i. While xi_1 and yi_1 represent the horizontal- and vertical-direction coordinates, respectively, of the upper left corner, xi_2 and yi_2 represent the horizontal- and vertical-direction coordinates, respectively, of the lower right corner.

The history flag with respect to face number i indicates whether or not the face with face number i has been detected continuously from a past frame image. Each history flag is assigned either "past" or "new." If the history flag with respect to face number i is "past," it indicates that the face with face number i has been detected continuously from a past frame image. If the history flag with respect to face number i is "new," it indicates that the face with face number i has just been detected newly in the most recent frame image.

For example, consider a case where the face of a person $P_A$ is not detected from the frame images at time points $t_1$ to $t_{n-2}$ but is detected from the frame image at time points $t_{n-1}$ and $t_n$. It is assumed that the face of the person $P_A$ is assigned face number 1. In this case, the history flag with respect to face number 1 is "new" after the face detection processing and identification processing with respect to the frame image at time point $t_{n-1}$ and before the face detection processing and identification processing with respect to the frame image at time point $t_n$, and is "past" after the face detection processing and identification processing with respect to the frame image at time point $t_n$.

Then further suppose that the face of the person $P_A$ is not detected from the frame images at time points $t_{n+1}$ to $t_{n+4}$ but is detected from the frame image at time point $t_{n+5}$. In this case, through the face detection processing and identification processing with respect to the frame images at time points $t_{n+1}$ to $t_{n+4}$, the face of the person $P_A$ is not detected from those frame images, and thus the history flag with respect to face number 1 is reset for the moment (when reset, a history flag has no significance). Thereafter when, through the face detection processing and identification processing with respect to the frame image at time point $t_{n+5}$, the face of the person $P_A$ is detected from the frame image at time point $t_{n+5}$, the face of the person $P_A$ is assigned face number 1 anew, and the history flag with respect to face number 1 is assigned "new."

The image shooting device 1 can exploit the face detection function to execute camera control and various application programs. More than one face may be detected from a shot image, in which case one of those faces is chosen which is to be taken as of interest, and camera control and various application programs are executed with respect to the face of interest thus chosen. Such a face of interest is called a priority face.

The priority face flag in the table 53 determines which face is the priority face. The face with a face number with respect to which the priority face flag is "1" is the priority face; a face with a face number with respect to which the priority face flag is "0" is not a priority face. In the example shown in FIG. 6, only the priority face flag with respect to face number 2 is "1," and accordingly the face corresponding to face number 2 is handled as the priority face.

Figure 8:
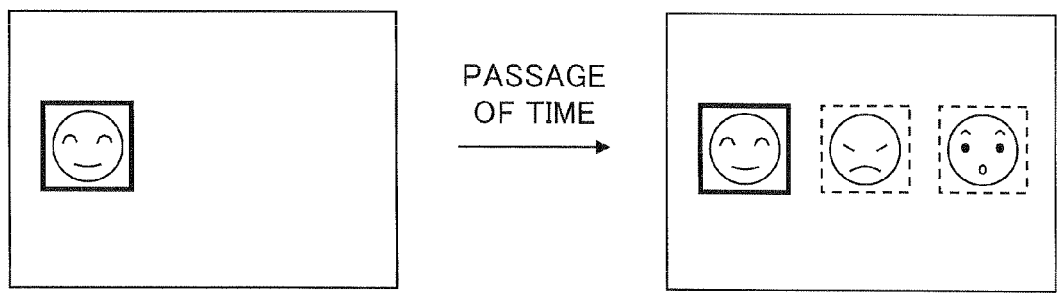
FIG. 8 is a diagram illustrating a method of choosing a priority face by the priority face choice portion in FIG. 3.
Figure 9:
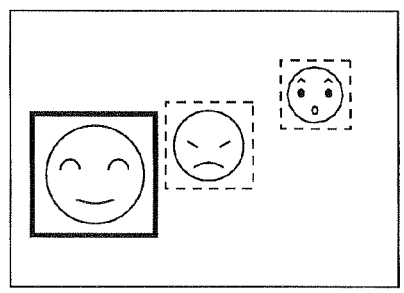
FIG. 9 is a diagram illustrating another method of choosing a priority face by the priority face choice portion in FIG. 3.
Figure 10:
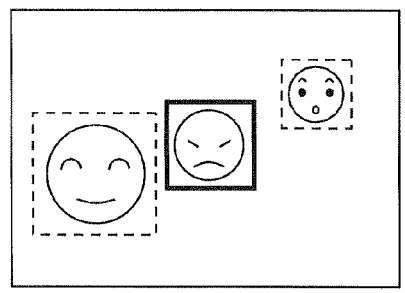
FIG. 10 is a diagram illustrating yet another method of choosing a priority face by the priority face choice portion in FIG. 3.

The priority face is initially chosen by the priority face choice portion 54 in FIG. 3. The priority face choice portion 54 chooses the priority face either automatically based on image data or according to manual operation by the user. Examples of methods for choosing a priority face which can be used in the priority face choice portion 54 will now be described with reference to FIGS. 8 to 10. In FIGS. 8 to 10, faces enclosed in thick solid-lined frames are the priority face.

For example, as shown in FIG. 8, while face detection processing is executed on one frame image after another sequentially starting with the frame image at time point $t_1$, whatever face is detected first may be chosen as the priority face.

For another example, a face detected from a frame image obtained when a triggering condition is fulfilled may be chosen as the priority face. The triggering condition is fulfilled, for example, when the operation portion 26 in FIG. 1 is operated in a predetermined manner.

If more than one face region is extracted from the frame image obtained when the triggering condition is fulfilled, the priority face may be chosen by considering the sizes of the face regions, which are proportional to the sizes of the corresponding faces. Specifically, for example, as shown in FIG. 9, the face corresponding to, of those face regions, the one with the largest size may be chosen as the priority face.

Instead, if more than one face region is extracted from the frame image obtained when the triggering condition is fulfilled, the priority face may be chosen by considering the positions of the face regions. Superficially, for example, as shown in FIG. 10, of those face regions, the one whose center is closest to the center of the frame image may be identified so that the face corresponding to that face region may be chosen as the priority face.

For yet another example, the priority face may be chosen in response to, and in accordance with, operation by the user specifying it.

As the additional information in the table 53, various kinds of information on faces can be stored. FIG. 6 omits the listing of the specific contents of the additional information. What the additional information is used for will be described later.

Once a face is chosen as the priority face, as long as the face continues to be detected by face detection processing, that face needs to be kept recognized as the priority face. To achieve this, after the priority face is chosen by the priority face choice portion 54, the image shooting device 1 repeatedly executes the face detection processing and identification processing described above to follow up faces—not only the priority face but also other faces—on the image. The image shooting device 1 achieves this following-up without use of complicated processing such as face recognition technology but based on position information of face regions. Thus, here, no complicated processing is required as would by face recognition technology for extracting an individual's features from an image of his face to achieve the following-up of a particular face.

If, however, the priority face is temporarily shielded by another subject for instance, it cannot be detected from the current frame image, and this temporarily makes its following-up difficult. Given that a shielding of the priority face and the resulting inability to detect it is inevitable, what is needed is an ability to restart the following-up of the priority face correctly when it stops being shielded. The image shooting device is furnished with a distinctive function of being able to restart the following-up of a priority face correctly.

Figure 11:
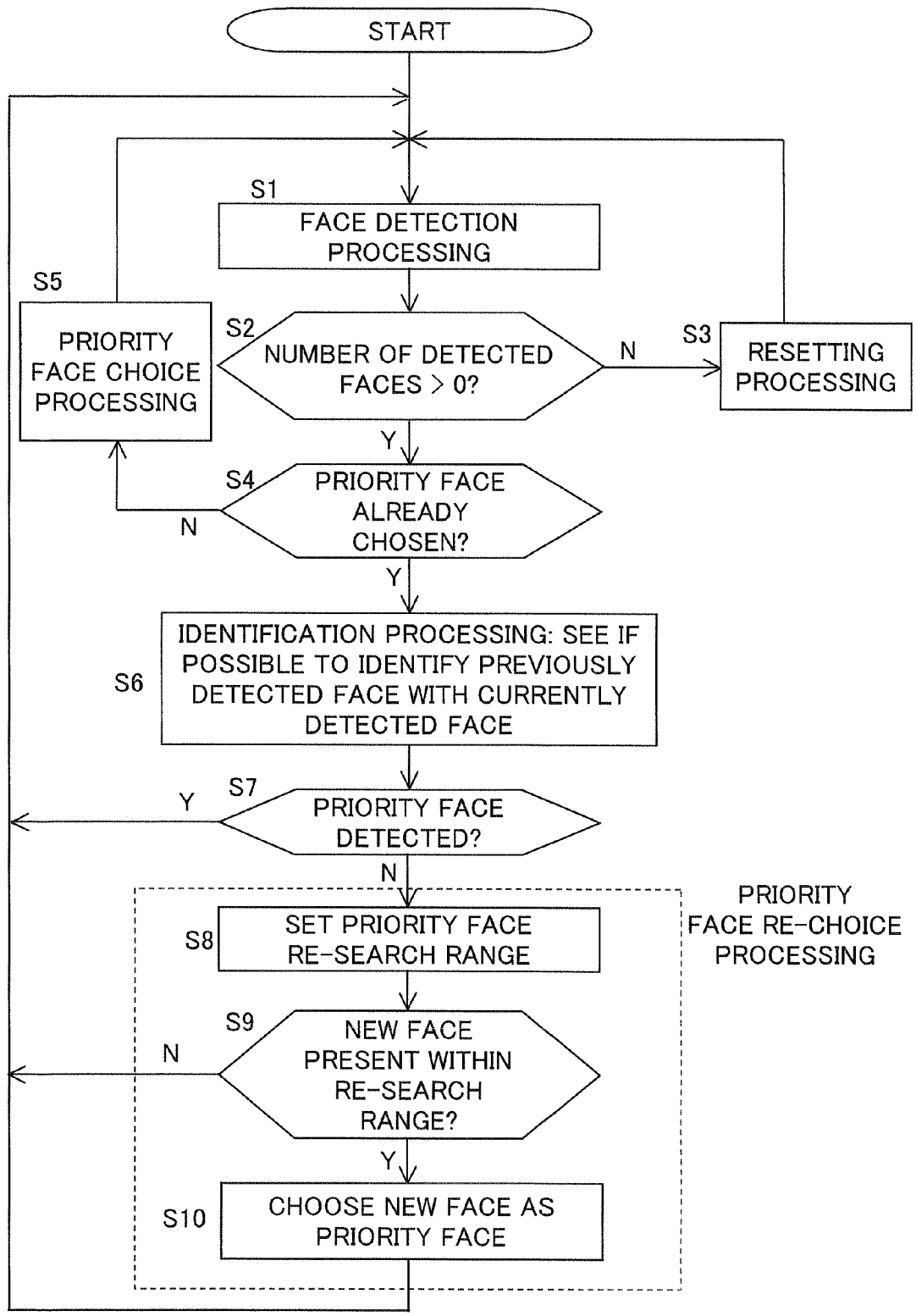
FIG. 11 is an operation flow chart of the image shooting device of FIG. 1, with focus placed on following-up of a priority face.

Procedure for Priority Face Follow-up: The procedure for achieving the function will now be described with reference to FIG. 11. FIG. 11 is a flow chart of the operation of the image shooting device 1 with focus placed on the following-up of the priority face. The processing in steps S1 through S10 is executed by the face processing block 50.

First, in step S1, the face detection portion 51 performs face detection processing. The face detection processing here is performed on the current frame image. The current frame image denotes the most recent frame image as obtained just when given processing, such as face detection processing, is performed. The face detection processing in step S1 is performed periodically, its execution period being equal to the length of time between time points $t_{n-1}$ and $t_n$. Moreover, as described previously, the embodiment under discussion assumes that the length of time between time points $t_{n-1}$ and $t_n$ is equal to the frame period. Thus, the face detection processing in step S1 is executed for each frame image. The execution period of the face detection processing in step S1 may instead be an integer times (e.g., twice or three times) the frame period.

On completion of face detection processing in step S1, an advance is made to step S2. In step S2, based on the results of the face detection processing in step S1, the face processing block 50 check whether or not one or more faces have been detected from the current frame image. If one or more faces have been detected from the current frame image, an advance is made to step S4. If no face has been detected from the current frame image, then in step S3, resetting processing is performed, and then a return is made to step S1. In the resetting processing, all the data in the table 53 is deleted.

In step S4, whether or not a priority face has already been chosen by the priority face choice portion 54 is checked. If a priority face has already been chosen by the priority face choice portion 54, an advance is made to step S6; if no priority face has yet been chosen, an advance is made to step S5. In step S5, a priority face is chosen by the priority face choice portion 54, and then a return is made to step S1. The result of the choice of the priority face is reflected in the priority face flag in the table 53. Incidentally, not always does a priority face need to be chosen in step S5. As long as no priority face has been chosen by the priority face choice portion 54, the advance from step S4 to step S5 takes place repeatedly, and meanwhile a priority face can be chosen whenever necessary.

In step S6, the face follow-up portion 52 performs the identification processing described previously. Specifically, based on the results of the face detection processing last time and this time, that is, based on the face detection information generated for the frame images last time and this time, the face follow-up portion 52 checks if it can identify the face detected from the frame image last time with the face detected from the frame image this time. Here, the frame image this time is synonymous with the current frame image above. If the frame image last time is the frame image at time point $t_{n-1}$, the frame image this time is the frame image at time point $t_n$. Along with the results of the face detection processing in step S1, the results of the identification processing in step S6 are reflected in the data in the table 53.

Then in step S7, whether or not the priority face is detected from the frame image this time is checked. If the frame images last time and this time both contain the face chosen as the priority face, and in addition if the detection and identification of that face has been successful, it is judged that the priority face is detected from the frame image this time, and a return is made from step S7 to step S1, so that the processing in the above-described steps starting with S1 is executed again. By contrast, if the priority face is not detected from the frame image this time, it is judged that the priority face has disappeared, and an advance is made to step S8. In steps S8 through S10, processing for re-choosing a priority face is executed. The re-choice processing in steps S8 through S10 is executed by the face follow-up portion 52.

In the re-choice processing, first, information on the priority face as it was on the last frame image from which it could be detected is retained in the table 53. The information so retained will hereinafter be called the retained priority face information. The retained priority face information includes position formation of the priority face as it was on the last frame image from which it could be detected, and may also include additional information on the priority face. In step S8, based on the position information of the priority face included in the retained priority face information, the face follow-up portion 52 sets a re-search range in which to search for a priority face. Then in step S9, the re-search range is applied to the frame image this time, and whether or not a newly detected face is present within the re-search range on the frame image this time is checked. If a newly detected face is present within the re-search range on the frame image this time, then in step S10, the newly detected face is re-chosen as a priority face, and a return is made to step S1. By contrast, if no newly detected face is present within the re-search range on the frame image this time, a return is made to step S1 without re-choosing a priority face.

A specific example of operation according to the operation flow chart in FIG. 11, as implemented in specific case α, will now be described. FIGS. 12A to 12E show images 300, 310, 320, 330, and 340, which are the frame images at time points $t_1$, $t_2$, $t_{n-1}$, $t_n$, and $t_{n+5}$, respectively, as observed in specific case α (in this specific case α, $n \geq 4$). FIG. 13A to 13E show the data of the table 53 at time points $t_1$, $t_2$, $t_{n-1}$, $t_n$, and $t_{n+5}$, respectively. FIG. 13A to 13E omit the listing of the coordinates representing the positions of the face regions and the listing of the specific contents of the additional information; in reality, these coordinates and additional information are kept constantly updated according to the results of face detection processing and identification processing.

In case α, first, from the frame image 300 at time point $t_1$, faces $FC_1$ and $FC_2$ with respect to two persons, respectively, are detected. Face regions 301 and 302 are the face regions with respect to the faces $FC_1$ and $FC_2$, respectively, extracted from the frame image 300. Assume that the faces $FC_1$ and $FC_2$ are assigned face numbers 1 and 2 respectively. It is also assumed that, at this point, no priority face has been chosen by the priority face choice portion 54. Thus, at this point, as shown in FIG. 13A, the history flags with respect to face numbers 1 and 2 are both "new," and the priority face flags with respect to face numbers 1 and 2 are both "0."

Suppose that, thereafter, also from the frame image 310 at time point $t_2$, the faces $FC_1$ and $FC_2$ are detected. Thus, as shown in FIG. 13B, the history flags with respect to face numbers 1 and 2 are both turned to "past." Face regions 311 and 312 are the face regions with respect to the faces $FC_1$ and $FC_2$, respectively, extracted from the frame image 310. Assume that, at time point $t_2$, the face $FC_1$ is chosen as a priority face. Thus, the priority face flag of face number 1 alone is assigned "1."

Figure 12A:
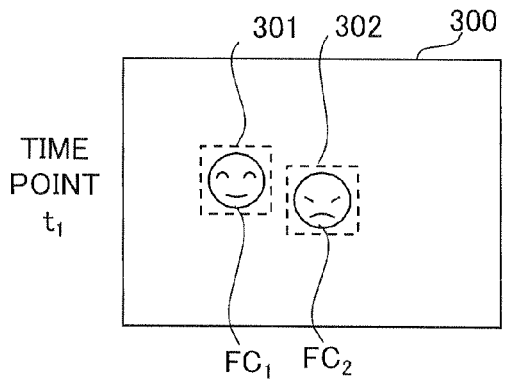
FIGS. 12A to 12E are diagrams showing, in connection with an embodiment of the invention, temporal change of the position of two faces along with how a priority face is chosen.
Figure 12B:
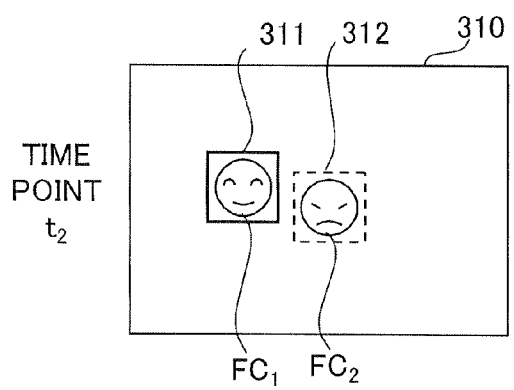
Figure 12C:
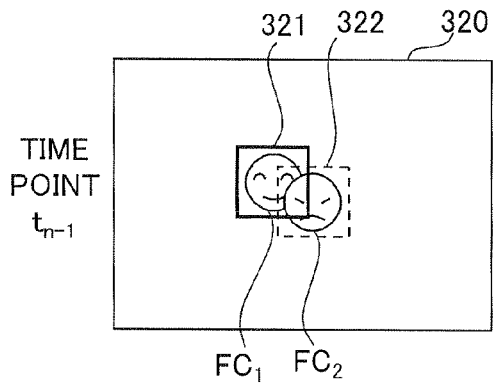

Suppose that, thereafter, the faces $FC_1$ and $FC_2$ are detected from each of the frame images at time points $t_3$ to $t_{n-1}$. In this case, for each of the frame images at time points $t_3$ to $t_{n-1}$, the processing in steps S1, S2, S4, S6, and S7 is executed. Since the face $FC_1$ as the priority face is detected from each of the frame images at time points $t_3$ to $t_{n-1}$, the priority face re-choice processing in steps S8 through S10 is not executed for any of these frame images. Face regions 321 and 322 in FIG. 12C are the face regions with respect to the faces $FC_1$ and $FC_2$, respectively, extracted from the frame image 320 at time point $t_{n-1}$.

Figure 12D:
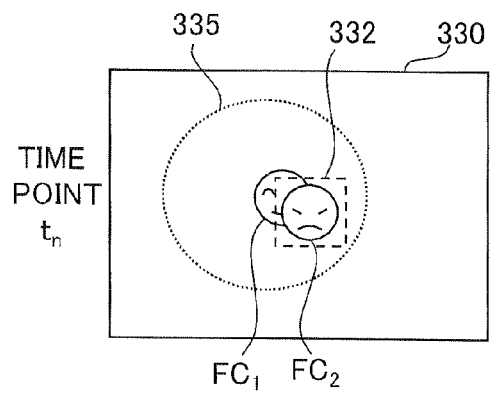

As a result of movement of the subject in the real space, at time point $t_{n-1}$, part of the face $FC_1$ is hidden behind the face $FC_2$. Suppose that, at time point $t_n$, the face $FC_1$ is shielded so much that face $FC_1$ cannot be detected. That is, suppose that, in the face detection processing for the frame image 330 at time point $t_n$, the face $FC_2$ alone is detected from the frame image 330 but the face $FC_1$ as the priority face is not. Then, through steps S6 and S7, step S8 is reached, where priority face re-choice processing is executed. A face region 332 in FIG. 12D is the face region with respect to the face $FC_2$ extracted from the frame image 330 at time point $t_n$.

As described previously, in re-choice processing, information on the priority face as it was on the last frame image from which it could be detected, that is, retained priority face information, is retained in the table 53. Viewed from the time point of the start of re-choice processing in case α, the last frame image on which the priority face could be detected is the frame image 320 at time point $t_{n-1}$. Accordingly, information on the priority face as it was on the frame image 320 is retained as retained priority face information in the table 53. In the table 53 at time point $t_n$ shown in FIG. 13D, how such information is retained is omitted, and all items of information with respect to face number 1 are left blank. The retained priority face information may be stored in the memory region allocated for storage of those items of information with respect to face number 1.

To search for a priority face anew, in step S8, the face follow-up portion 52 sets a priority face re-search range. The re-search range is inside the circle indicated by the reference sign 335 in FIGS. 12D and 12E. Based on the position information of the priority face included in the retained priority face information, the face follow-up portion 52 sets the re-search range 335. More specifically, it sets as the re-search range 335 the region inside a circle with a radius of $TH_2$ about the center of the face region 321 on the frame image 320 at time point $t_{n-1}$. Here, $TH_2$ has a greater value than the previously mentioned $TH_1$ defining the radius of the search range 213 (and 223) shown in FIG. 4C. Accordingly, the re-search range 335 is larger than the search range 213 shown in FIG. 4C.

In step S9, the face follow-up portion 52 checks whether or not a newly detected face is present within the re-search range 335. Only if one is found there, a priority face is re-chosen. More specifically, a face region that has its center within the re-search range 335 and in addition whose history flag is assigned "new" is searched for in a frame image in which to re-choose a priority face (in case α, any of the frame images at time points $t_n$ to $t_{n+5}$), and only if such a face region is found, the face corresponding to the face region so found is re-chosen as a priority face.

Suppose that the frame images at time points $t_{n+1}$ to $t_{n+4}$ are all the same as the frame image 330 at time point $t_n$, and that the face $FC_2$ alone is detected from each of the frame images at time points $t_n$ to $t_{n+4}$. The center of the face region of the face $FC_2$ extracted from each of the frame images at time points $t_n$ to $t_{n+4}$ is located within the re-search range 335. However, since the face $FC_2$ has been detected in every frame image at time points $t_{n-1}$ and $t_{n+3}$, the history flag corresponding to the face region of the face $FC_2$ is "past." Thus, the face $FC_2$ is not chosen as a priority face.

Figure 12E:
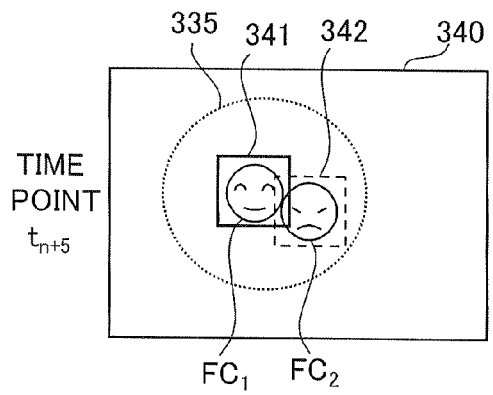

Suppose that, thereafter, the faces $FC_1$ and $FC_2$ are detected from the frame image 340 at time point $t_{n+5}$. Face regions 341 and 342 in FIG. 12E are the face regions with respect to the faces $FC_1$ and $FC_2$, respectively, extracted from the frame image 340 at time point $t_{n+5}$. The face corresponding to the face region 341 is not a face that has been detected continuously from a past frame image, but is a face newly detected in the most recent frame image (i.e., the frame image 340). Thus, the history flag corresponding to the face region 341 is assigned "new." Further suppose that the center of the face region 341 is located within the re-search range 335. Then, in step S10, the face follow-up portion 52 re-chooses the face corresponding to the face region 341 as a priority face. FIG. 13E shows the contents of the table 53 at time point $t_{n+5}$, as observed when the face region 341 is assigned face number 1. The results of the re-choice of the priority face are reflected in the table 53. Thus, in FIG. 13E, the priority face flag with respect to face number 1 is assigned "1."

As described above, in the process of repetition of loop processing including face detection processing, identification processing, and priority face re-choice processing, when a new face that does not match a previously detected face appears within a re-search range, the new face is re-chosen as a priority face. In this way, even if a face of interest ($FC_1$) to be chosen as a priority face becomes temporarily undetectable, it is thereafter possible to re-choose the face of interest ($FC_1$) as a priority face correctly (it is possible to restart the following-up of a priority face correctly).

Compared with the amount of change in the position of a face between temporally consecutive frame images, the amount of change in the position of a face between time points $t_{n-1}$ and $t_{n+5}$ is likely to be greater. This is because, compared with the length of time corresponding to the former amount of change in position, the length of time corresponding to the latter amount of change in position is longer. With this taken into consideration, the re-search range 335 is given a larger size than the search range in identification processing (the search ranges 213 and 223 shown in FIG. 4C). This allows more reliable re-choice of a priority face.

Based on the priority face chosen as described above, camera control and application programs can be executed. For example, during shooting of a moving image, it is possible to perform automatic focus control so that focus is kept on the priority face, and to perform exposure control so that the priority face has a proper luminance level. Such automatic focus control is achieved, for example, by controlling the position of the focus lens 31 based on the contrast in the face region of the priority face; such exposure control is achieved, for example, by controlling the aperture size of the aperture stop 32 or the like so that the face region of the priority face has a proper average luminance level. It is also possible to perform white balance control so that the priority face has a desired white balance. It is possible even to control the position of the zoom lens 30 with attention paid to the priority face.

Presented below are Applied Examples 1 to 4, which are applied examples, or modified examples, of processing based on the processing described thus far. Unless inconsistent, the description thus far (including that of case α) applies to any of the applied examples. Unless inconsistent, the description given in connection with any applied example applies to any other applied example.

APPLIED EXAMPLE 1

Figure 14:
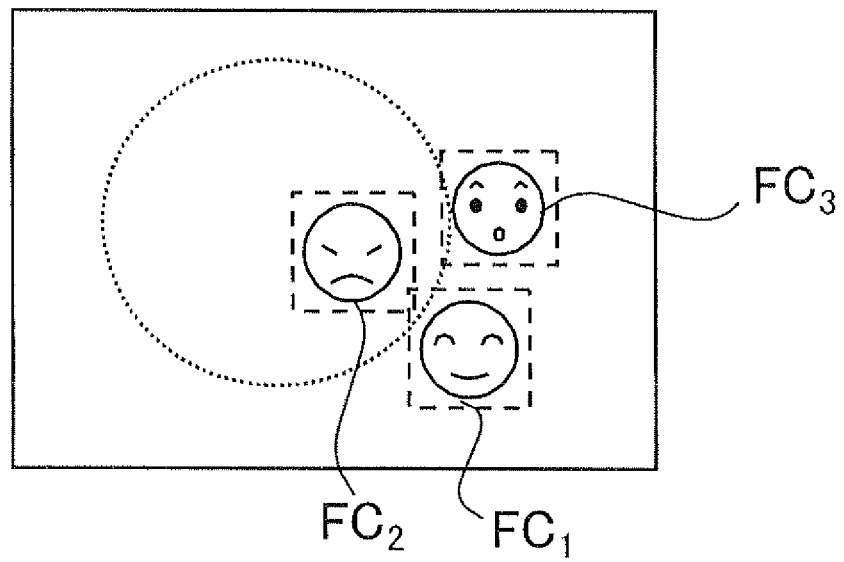
FIG. 14 is a diagram showing a face of interest going out of a re-search range.

First, a first applied example will be described. In case α described above, as a result of movement of the subject in the real space, the face $FC_1$ becomes hidden behind the face $FC_2$, and this makes the face $FC_1$ as the priority face temporarily undetectable. Thereafter, if, as in case α, the face $FC_1$ is detected anew as a new face within the priority face re-search range, a priority face is re-chosen as intended. However, if, as shown in FIG. 14, the face $FC_1$ takes a path traversing behind the face $FC_2$ and going out of the re-search range, unless the re-search range is enlarged, there will be more likelihood that a priority face will not be re-chosen as desired. On the other hand, if the re-search range is enlarged, there will be more likelihood that a face $FC_3$ different from either the face $FC_1$ or $FC_2$ will be re-chosen as a priority face. It is therefore undesirable simply to enlarge the re-search range.

Out of these considerations, in Applied Example 1, the movement direction and movement speed of the face $FC_1$ as the priority face as observed on the image are measured, and based on the results of measurement, the shape and size of the re-search range are determined.

Now, with reference to the specific example assumed for case α, Applied Example 1 will be described more specifically. In Applied Example 1, a movement detection portion (unillustrated) is provided within the video signal processing portion 13 (or the face processing block 50 in FIG. 3). As long as the face $FC_1$ as the priority face is being detected by face detection processing, the movement detection portion constantly monitors the movement direction and movement speed of the face $FC_1$. Information on the monitored movement direction and movement speed may be included in the additional information in the table 53. Then, when the face $FC_1$ as the priority face ceases to be detected by face detection processing, based on its movement direction and movement speed as they were observed in the last frame image from which it could be detected, the re-search range is set.

Figure 15:
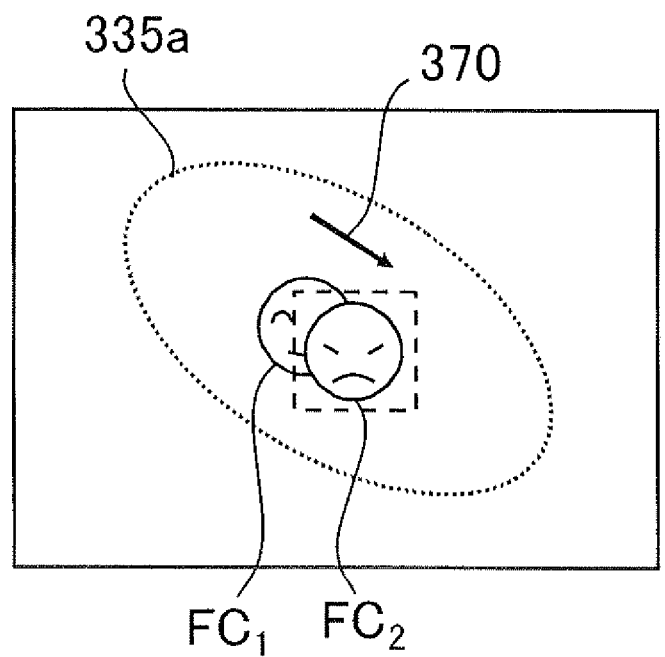
FIG. 15 is a diagram showing, in connection with Applied Example 1 embodying the invention, a priority face re-search range.

For example, consider a case where, as in case α, the faces $FC_1$ and $FC_2$ are detected from the frame image at time point $t_{n-1}$ and the face $FC_2$ alone is detected from the frame image at time point $t_n$. In this case, the face follow-up portion 52 handles as a reference movement direction and a reference movement speed the movement direction and movement speed of the face $FC_1$ as observed between the frame images at time points $t_{n-2}$ and $t_{n-1}$, and sets a re-search range based on the reference movement direction and reference movement speed. In Applied Example 1, the re-search range set with respect to the frame images at time points starting with $t_n$—including the frame image at time point $t_n$ itself—is represented by the reference sign 335a. FIG. 15 shows the re-search range 335a along with the frame image in which the re-search range 335a is set. In FIG. 15, an arrow 370 represents the reference movement direction. Assume here that the reference movement direction points to the lower right of the image.

Whereas the exterior shape of the re-search range 335 shown in FIG. 12D is perfectly circular, the exterior shape of the re-search range 335a is elliptical. That is, the re-search range 335a has a directional shape. The center of the ellipse coincides with the center of the face region 321 on the frame image 320 at time point $t_{n-1}$. Instead, a point located to the lower right of the center of the face region 321 on the frame image 320 at the time point $t_{n-1}$ may be taken as the center of the ellipse. The direction of the major axis of the ellipse coincides with the reference movement direction. Of the major and minor axes of the ellipse, at least the major axis has a length greater than the diameter of the exterior circle of the search range 213 shown in FIG. 4C; the minor axis may also have a length greater than the diameter of the exterior circle of the search range 213. The length of the major axis may be increased as the reference movement speed increases.

The exterior shape of the re-search range may be other than elliptical. For example, the exterior shape of the re-search range may be rectangular or rhombic.

If the face $FC_1$ moved down- and rightward between the frame images at time points $t_{n-2}$ and $t_{n-1}$, it is likely that the face $FC_1$ continues moving down- and rightward thereafter. Accordingly, the shape of the re-search range is determined based on the reference movement direction as described above. This allows more proper re-choice of a priority face.

For example, the movement detection portion mentioned above finds an optical flow between temporally consecutive frame images based on the image data of those frame images. Methods for finding an optical flow include a block matching method, a representative point matching method, a gradient method, etc. The optical flow so found is represented by a motion vector (movement vector) that represents the motion of a subject between the consecutive frame images. A motion vector is a two-dimensional quantity indicating the movement direction and movement speed of an object on an image. A motion vector detected with respect to a face of interest represents the movement direction and movement speed of the face of interest.

APPLIED EXAMPLE 2

Next, a second applied example will be described. In the above-described technique, if a face region of interest fulfills the two conditions: its center is located within a re-search range 335, and its history flag is assigned "new," then the face corresponding to the face region fulfilling those basic conditions is re-chosen as a priority face. With respect to the face region to be re-chosen as a priority face, yet another predetermined condition may be imposed as an additional condition. That is, a face region fulfilling an additional as well as the basic conditions may be searched for in a frame image in which to re-choose a priority face so that, only if a face region fulfilling both the basic and additional conditions is found, the face corresponding to the face region so found may be re-chosen as a priority face.

Whether or not the additional condition is fulfilled is judged based on whether or not the features of the previous priority face agree with, or are similar to, the features of the face to be chosen as a priority face anew. A specific example will be described below. What has been assumed for case α applies equally to Applied Example 2.

For judgment of whether or not the additional condition is fulfilled, as the additional information in the table 53 is stored face size information, face inclination information, face orientation information, face luminance information, and face color information that respectively represent the size, inclination, orientation, luminance level, and hue of a face (in particular, a priority face) on an image. Also stored in the additional information in the table 53 is similarity information that represents the degree of similarity between a reference face image used in face detection processing and an image within a face region. In a case where a plurality of reference face images are used in face detection processing, further stored in the additional information in the table 53 is face type information that represents to which of the reference face images an image within a face region exhibits the greatest similarity. These pieces of information are updated every time face detection processing is performed. These pieces of information stored in the additional information with respect to a priority face represents the features of the priority face.

When priority face re-choice processing is executed, retained priority face information including additional information with respect to the last frame image from which a priority face could be detected is retained in the table 53. In case α, additional information with respect to the priority face $FC_1$ on the frame image at time point $t_{n-1}$ (including face size information, face inclination information, face orientation information, face luminance information, face color information, similarity information, and face type information) is retained in the table 53.

A face within a face region fulfilling the above-mentioned basic conditions is, if it also fulfills an additional condition, re-chosen as a priority face. Accordingly, a face within a face region fulfilling the above-mentioned basic conditions is grasped as a candidate for a priority face, and will be called a candidate priority face. On the other hand, a frame image from which a face region containing a candidate priority face is extracted will be called a candidate extraction source frame image. In Applied Example 2, only if a candidate priority face fulfills one or more additional conditions as described below, it is re-chosen as a priority face.

A first additional condition is that the difference between the size of the priority face $FC_1$ defined by the retained priority face information and the size of the candidate priority face on the candidate extraction source frame image is equal to or smaller than a predetermined size threshold.

The former size is the size of the face region 321, and the latter size is the size of the face region containing the candidate priority face.

A second additional condition is that the difference between the inclination of the priority face $FC_1$ defined by the retained priority face information and the inclination of the candidate priority face on the candidate extraction source frame image is equal to or smaller than a predetermined inclination difference.

Figure 16:
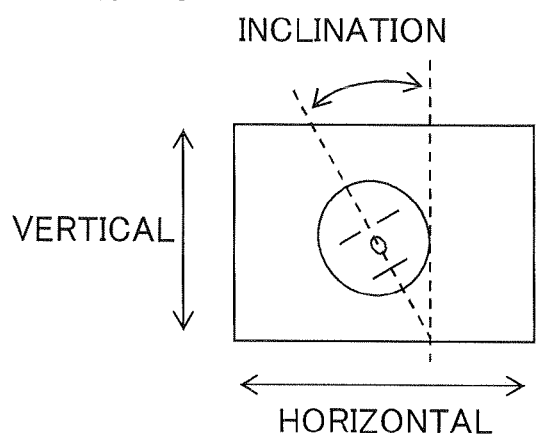
FIG. 16 is a diagram showing the definition of the inclination of a face.

The face detection portion 51 is so formed that it can detect the inclination of a face within an input image (frame image) during execution of face detection processing. For example, by rotating the input image and performing the above-described face detection processing on the so rotated image, it is possible to detect an inclined face and also to detect the inclination (inclination angle) of the face. Here, the inclination of a face is, as shown in FIG. 16, the inclination of the face relative to the vertical direction of the input image; for example, it is the inclination of the straight line across the centers of the mouth and forehead in the face relative to a straight line parallel to the vertical direction of the input image.

A third additional condition is that the orientation of the priority face $FC_1$ defined by the retained priority face information and the orientation of the candidate priority face on the candidate extraction source frame image agree, or substantially agree, with each other.

Figure 17A:
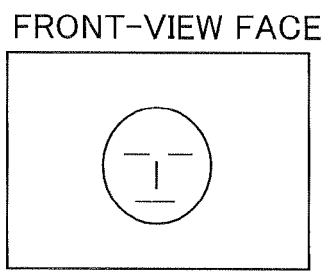
FIGS. 17A to 17C are diagrams showing the definitions of a front-view face, an oblique-view face, and a profile.
Figure 17B:
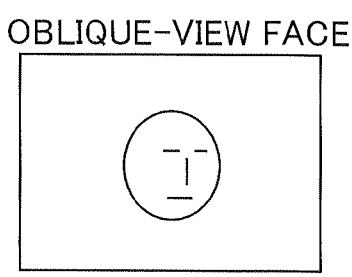
Figure 17C:
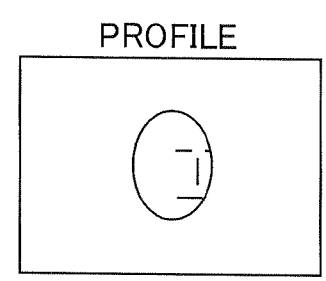

The face detection portion 51 is so formed that it can detect the orientation of a face in an input image (frame image) during execution of face detection processing. Specifically, for example, the face detection portion 51 can detect whether a face detected from an input image is a front-view face (face as seen from the front) as shown in FIG. 17A, an oblique-view face (face as seen from an oblique direction) as shown in FIG. 17B, or a profile (face as seen from a side) as shown in FIG. 17C, distinguishing a plurality of steps. Various techniques have been proposed for detecting the orientation of a face, and the face detection portion 51 can adopt any of them. For example, as by the technique disclosed in JP-A-H10-307923, face parts such as the eyes, nose, and mouth are found in due order from an input image to detect the position of a face in the image, and then based on projection data of the face parts, the orientation of the face is detected. Instead, for example, the technique disclosed in JP-A-2006-72770 may be used.

A fourth additional condition is that the difference between the luminance level of the priority face $FC_1$ defined by the retained priority face information and the luminance level of the candidate priority face on the candidate extraction source frame image is equal to or smaller than a predetermined luminance level difference.

The luminance level of the priority face $FC_1$ defined by the retained priority face information denotes the average luminance of the face region 321 on the frame image 320 at time point $t_{n-1}$ (see FIG. 12C). The luminance level of the candidate priority face to be compared with the luminance level of the priority face $FC_1$ denotes the average luminance of the face region of the candidate priority face on the candidate extraction source frame image.

A fifth additional condition is that the difference between the hue of the priority face $FC_1$ defined by the retained priority face information and the hue of the candidate priority face on the candidate extraction source frame image is equal to or smaller than a predetermined hue difference.

As the hue of the priority face $FC_1$ defined by the retained priority face information, the average hue of the face region 321 on the frame image 320 at time point $t_{n-1}$ can be used (see FIG. 12C). As the hue of the candidate priority face to be compared with the hue of the priority face $FC_1$, the average hue of the face region of the candidate priority face on the candidate extraction source frame image may be used.

A sixth additional condition is that the difference between the degree of similarity between the image of the priority face $FC_1$ and the reference face image as indicated by the similarity information included in the retained priority face information and the degree of similarity between the image of the candidate priority face and the reference face image is equal to or smaller than a predetermined similarity difference.

The former degree of similarity denotes the degree of similarity between the image within the face region 321 on the frame image 320 at time point $t_{n-1}$ and the reference face image used in face detection processing, and the latter degree of similarity denotes the degree of similarity between the image within the face region in the candidate priority face on the candidate extraction source frame image and the reference face image used in the face detection processing. A degree of similarity represents how similar the compared images are to each other, and has a greater value the more similar they are.

A seventh additional condition is that the face type information included in the retained priority face information and the face type information with respect to the candidate priority face agree with each other.

A description will now be given of how to determine whether or not the seventh additional condition is fulfilled, taking up a specific example. As described above, in face detection processing, the image in a region of interest set within an input image (frame image) is compared with a reference face image with a predetermined image size to evaluate the degree of similarity between the two images, and based on the degree of similarity a judgment is made as to whether or not a face is contained in the region of interest (whether or not the region of interest is a face region). As the reference face image here, a plurality of mutually different reference face images may be used. For the sake of concrete description, consider a case where the plurality of reference face images consists of a first, a second, and a third reference face image. In this case, the degree of similarity between the image in the region of interest and each of the first to third reference face images is found as first to third degrees of similarity respectively.

Suppose now that, of the first to third degrees of similarity found with respect to the face region 321, the first is the greatest. This is reflected in the face type information included in the retained priority face information. In this case, if, of the first to third degrees of similarity found with respect to the face region of the candidate priority face on the candidate extraction source frame image, the first is the greatest, the seventh additional condition is fulfilled; by contrast, if the second or third degree of similarity is the greatest, the seventh additional condition is not fulfilled.

In this way, by requiring, as an additional condition, that the features of the previous priority face agree with, or are similar to, the features of the face to be chosen as a priority face anew, it is possible to increase the likelihood that, after the previous priority face disappeared, a face truly of interest is re-chosen as a priority face.

APPLIED EXAMPLE 3

Next, a third applied example will be described. The size of the re-search range 335 shown in FIG. 12D is made larger than that of the search range 213 shown in FIG. 4C. Here, the size of the re-search range 335 may be varied in accordance with various indicators.

For example, the size of the re-search range 335 may be varied in accordance with the size of the priority face as it was on the last frame image from which it could be detected. The above-mentioned retained priority face information may be used to achieve that. In the context of case α, the size of the priority face as it was on the last frame image from which it could be detected corresponds to the size of the face region 321. Accordingly, for example, the size of the re-search range 335 is made larger the larger the size of the face region 321 becomes.

For another example, the luminance level of the priority face as it was on the last frame image from which it could be detected (i.e., the average luminance of the face region 321) may be referred to so that the size of the re-search range 335 may be made larger the lower that luminance level. Similarly, the contrast of the priority face as it was on the last frame image from which it could be detected (i.e., the contrast of the face region 321) may be referred to so that the size of the re-search range 335 may be made larger the lower that contrast. Normally, a low luminance level and/or contrast in a region to be taken as a face region makes face detection difficult, making it more prone to failure even when a face appears on the image. With this taken into consideration, the size of the re-search range 335 is varied in accordance with the luminance level and/or contrast. The contrast of the face region 321 is derived by finding the amount of predetermined high-frequency components contained in the spatial frequencies of the image within the face region 321.

For yet another example, the reference movement speed mentioned in connection with Applied Example 1 may be referred to so that the re-search range 335 may be made larger the higher the reference movement speed. This is because, the higher the reference movement speed, the more likely it is that the face to be chosen as a priority face ($FC_1$) will go out of the re-search range in a shorter time.

APPLIED EXAMPLE 4

Next, a fourth applied example will be described. In case α described previously, as a result of the face $FC_1$ being hidden behind the face $FC_2$, the face $FC_1$ to be chosen as a priority face becomes temporarily undetectable. Also in a case where the face $FC_1$ temporarily goes out of the shooting region (field of view) of the image shooting device 1 (hereinafter called case β), a method for re-choosing a priority face according to the invention functions effectively. The operation of the image shooting device 1 in case β will now be described as Applied Example 4.

FIGS. 18A to 18E show images 400, 410, 420, 430, and 440, which are frame the images at time points $t_1$, $t_2$, $t_{n-1}$, $t_n$, and $t_{n+5}$, respectively, in case β (in case β, n≧4).

As in case α, also in case β, suppose that faces $FC_1$ and $FC_2$ with respect to two persons, respectively, are detected from the frame images 400 and 410 at time points $t_1$ and $t_2$, and that the face $FC_1$ is chosen as a priority face by the priority face choice portion 54 at time point $t_2$. Moreover, assume that the faces $FC_1$ and $FC_2$ are assigned face numbers 1 and 2 respectively. Accordingly, at time point $t_2$, the history flags with respect to face numbers 1 and 2 are both assigned "past," and the priority face flag with respect to face number 1 alone is assigned "1."

Then, the faces $FC_1$ and $FC_2$ are detected from each of the frame images at time points $t_3$ to $t_{n-1}$, and the processing in steps S1, S2, S4, S6, and S7 is executed for each of the frame images at time points $t_3$ to $t_{n-1}$. Since the face $FC_1$ as the priority face is detected from each of the frame images at time points $t_3$ to $t_{n-1}$, the priority face re-choice processing in steps S8 through S10 is not executed for any of these frame images. Rectangular regions 401, 411, and 421 are the face regions with respect to the face $FC_1$ extracted from the frame images 400, 410, and 420 respectively, and rectangular regions 402, 412, and 422 are the face regions with respect to the face $FC_2$ extracted from the frame images 400, 410, and 420 respectively.

Figure 18A:
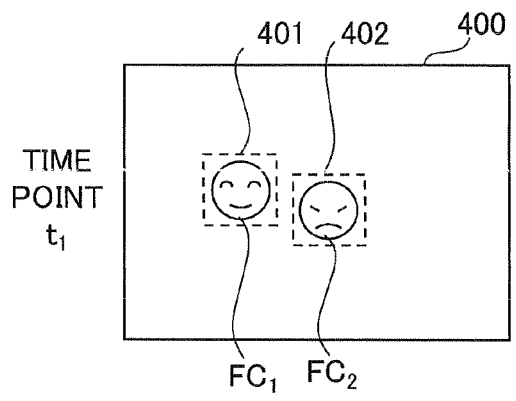
FIGS. 18A to 18E are diagrams showing, in connection with an embodiment of the invention, temporal change of the position of two faces along with how a priority face is chosen.
Figure 18D:
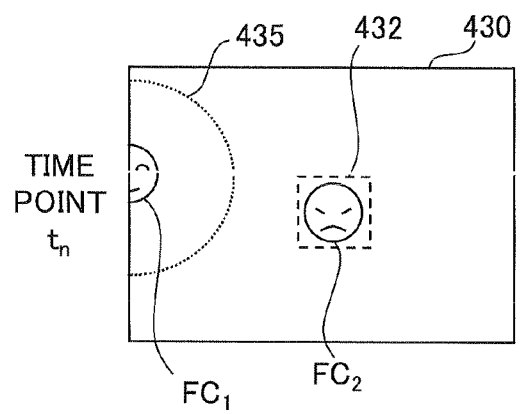
Figure 18B:
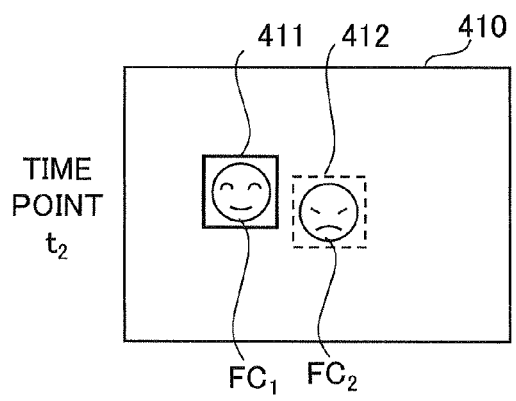

Suppose that, as a result of movement of the face $FC_1$ in the real space for instance, the face $FC_1$ is located near the outer edge of the shooting region of the image shooting device 1 at time point $t_{n-1}$, and that, at time point $t_n$, part or all of the face $FC_1$ goes out of the shooting region so much that the face $FC_1$ can no longer be detected by face detection processing. Then, through the face detection processing for the frame image 430 at time point $t_n$, the face $FC_2$ alone is detected from the frame image 430, whereas the face $FC_1$ as the priority face is not detected. As a result, through steps S6 and S7, step S8 reached, where priority face re-choice processing is executed. A face region 432 in FIG. 18D is the face region with respect to the face $FC_2$ extracted from the frame image 430 at time point $t_n$.

The priority face re-choice processing here is similar to that described previously. In priority face re-choice processing, information on the priority face as it was on the last frame image from which it could be detected, that is, retained priority face information, is retained in the table 53. Viewed from the time point of the start of re-choice processing in case β, the last frame image from which the priority face could be detected is the frame image 420 at time point $t_{n-1}$. Accordingly, information on the priority face as it was on the frame image 420 is retained as retained priority face information in the table 53.

To search for a priority face anew, in step S8, the face follow-up portion 52 sets a priority face re-search range. The re-search range is inside the circle indicated by the reference sign 435 in FIGS. 18D and 18E. The method for setting a re-search range here is similar to that in case α. Specifically, based on the position information of the priority face included in the retained priority face information, the face follow-up portion 52 sets as the re-search range 435 the region inside a circle with a radius of $TH_2$ about the center of the face region 421. In case β, however, as opposed to in case α, part of the exterior circle of the re-search range 435 is located outside the shooting region.

Thereafter, the face follow-up portion 52 searches, in a frame image in which to re-choose a priority face (in case β, any of the frame images at time point $t_n$ to $t_{n+5}$), for a face region that has its center within the re-search range 435 and in addition whose history flag is assigned "new," and only if such a face region is found, the face corresponding to the face region so found is re-chosen as a priority face.

Suppose that the frame images at time points $t_{n+1}$ to $t_{n+4}$ are all the same as the frame image 430 at time point $t_n$, and that the face $FC_2$ alone is detected from each of the frame images at time points $t_{n+1}$ to $t_{n+4}$. The center of the face region of the face $FC_2$ extracted from each of the frame images at time points $t_{n+1}$ to $t_{n+4}$ is not located within the re-search range 435; even if it were located within the re-search range 435, since the face $FC_2$ has been detected in every frame image at time points $t_{n-1}$ and $t_{n+3}$, the history flag corresponding to the face region of the face $FC_2$ is "past." Thus, the face $FC_2$ is not re-chosen as a priority face.

Figure 18E:
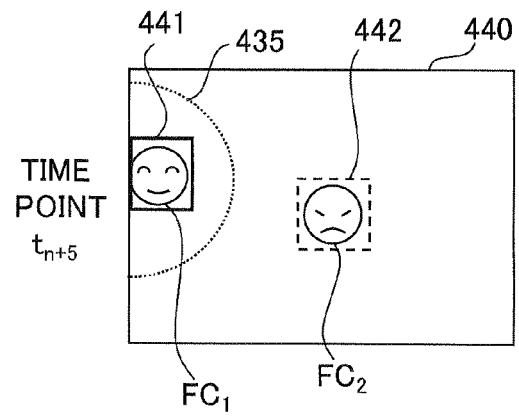
Figure 18C:
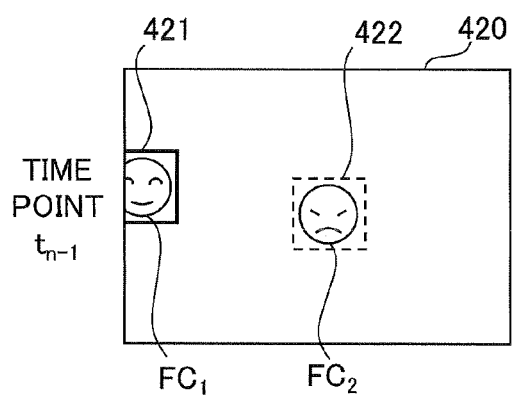
Figure 19A:
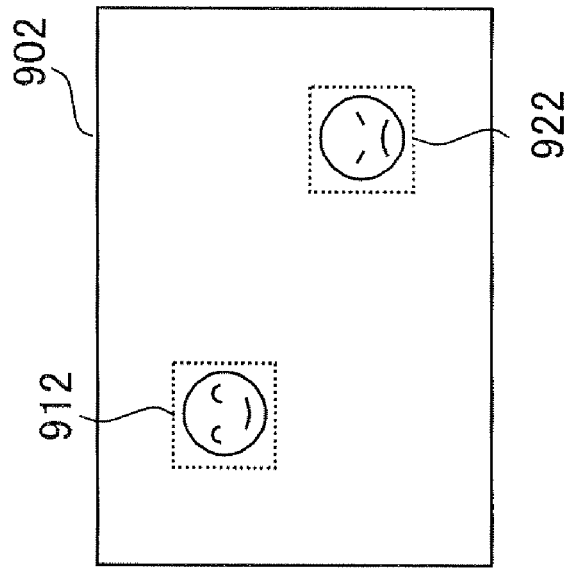
FIGS. 19A and 19B are diagrams illustrating, in connection with a conventional technology, identification processing.
Figure 19B:
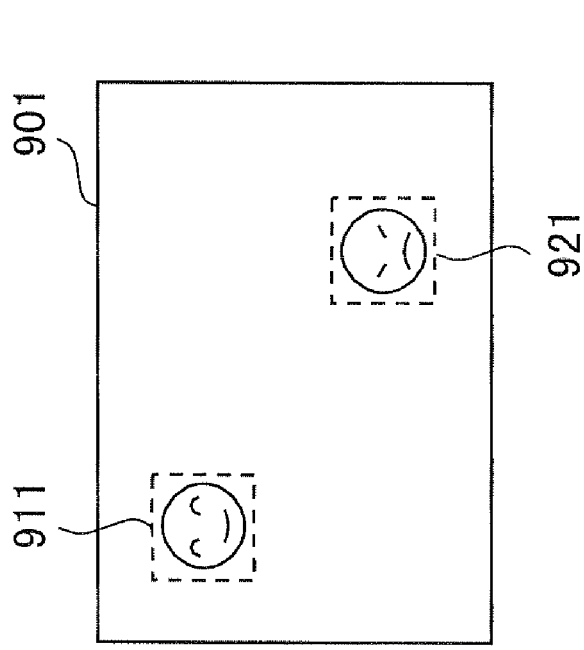
Figure 20A:
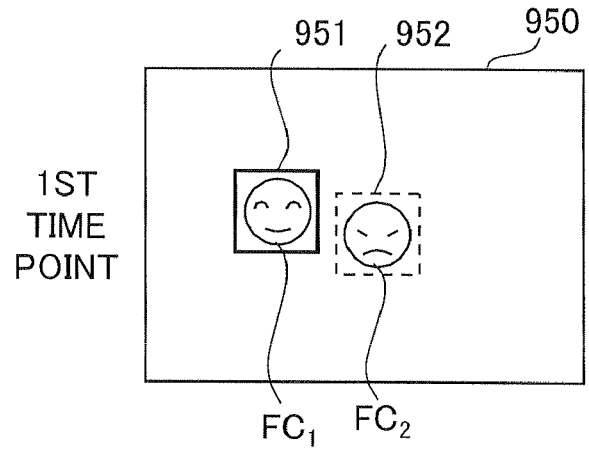
FIGS. 20A to 20C are diagrams showing change of a priority face as observed when conventional identification processing is executed.
Figure 20B:
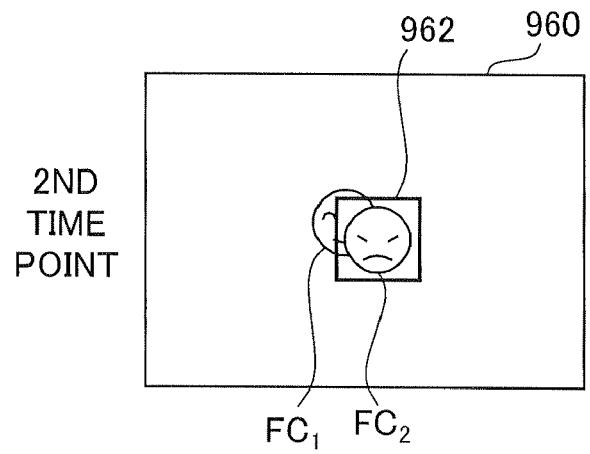
Figure 20C:
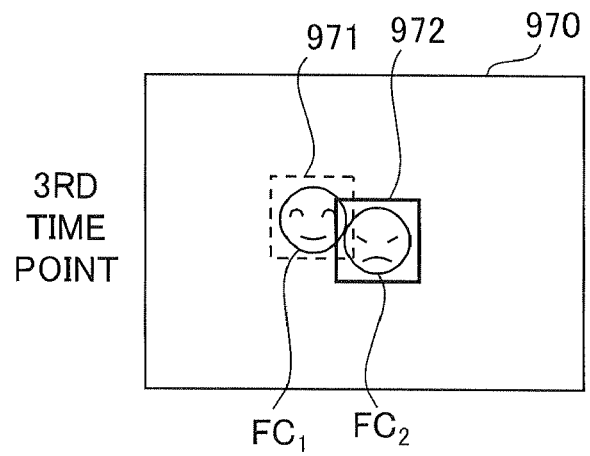
Figure 21A:
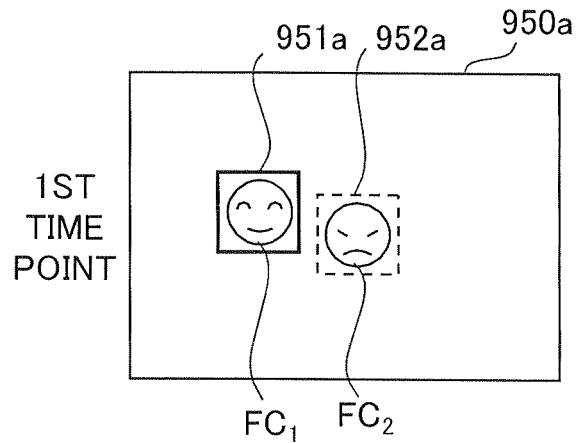
FIGS. 21A to 21C are diagrams showing change of a priority face as observed when conventional identification processing is executed.
Figure 21B:
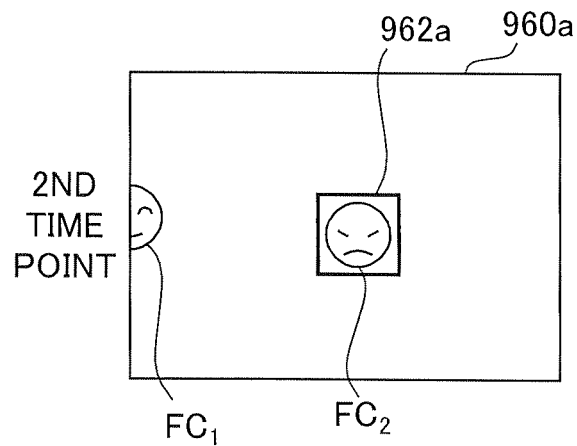
Figure 21C:
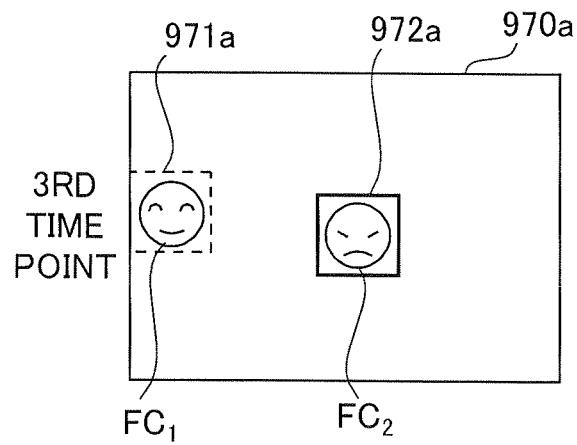

Suppose that, as a result of movement of the face $FC_1$ in the real space, or panning, thereafter, the faces $FC_1$ and $FC_2$ are detected from the frame image 440 at time point $t_{n+5}$. Face regions 441 and 442 in FIG. 18E are the face regions with respect to the faces $FC_1$ and $FC_2$, respectively, extracted from the frame image 440 at time point $t_{n+5}$. The face corresponding to the face region 441 is not a face that has been detected continuously from a past frame image, but is a face newly detected in the most recent frame image (i.e., the frame image 440). Thus, the history flag corresponding to the face region 441 is assigned "new." Further suppose that the center of the face region 441 is located within the re-search range 435. Then, in step S10, the face follow-up portion 52 re-chooses the face corresponding to the face region 441 as a priority face.

Modifications and Variations

The specific values given in the description above are merely examples, which, needless to say, may be modified to any other values. In connection with the embodiments described above, modified examples or supplementary explanations will be given below in Notes 1 to 3. Unless inconsistent, any part of the contents of these notes may be combined with any other.

Notes 1: In the embodiments described above, frames are taken as units, and various kinds of processing including face detection processing is performed on a series of frame images. Instead, fields may be taken as units, and such processing may be performed on a series of field images.

Notes 2: The image shooting device shown in FIG. 1 can be realized in hardware, or in a combination of hardware and software. In particular, the calculation processing executed by the blocks shown in FIG. 3 can be realized in software or in a combination of hardware and software. In a case where the image shooting device 1 is built with software, a block diagram showing the part realized in software serves as a functional block diagram of that part. All or part of the calculation processing may be prepared in the form of a software program so that, when the software program is executed on a program execution device (for example, a computer), all or part of the calculation processing is realized.

Notes 3: For example, one possible interpretation is that the face follow-up portion 52 includes an identification portion that performs the identification processing described above and a re-choice portion that performs the re-choice processing described above.

What is claimed is:

1. An image shooting device comprising:
    an image sensing portion that, through repeated shooting, acquires a series of input images having a plurality of input images formed in chronological order;
    a face detection portion that, based on image data of the series of input images, detects a human face from each input image and outputs position information representing position of a detected face on the image;
    a priority face choice portion that chooses a priority face from one or more faces detected by the face detection portion;
    an identification portion that, based on the position information of the faces detected by the face detection portion, searches for the priority face in each input image to detect the priority face as distinguished from any other face; and
    a re-choice portion that, when the priority face is detected by the identification portion from a first input image acquired after choice of the priority face but the priority face is not detected by the identification portion from a second input image acquired after the first input image, retains retained information including position information of the priority face on the first input image, the re-choice portion then executing, by use of the retained information, re-choice processing to re-choose the priority face,
    wherein, in the re-choice processing, based on the retained information and position information of a face on a third input image acquired after the second input image, the re-choice portion searches, within the third input image, for a to-be-re-chosen face to be re-chosen as a priority face anew under a condition different from a condition under which the identification portion searched for the priority face.

2. The image shooting device according to claim 1, wherein
    when two temporally consecutive input images from which the priority face is detected by the identification portion are fourth and fifth input images, with the fourth and fifth input images being acquired in this order,
    the identification portion sets, in the fifth input image, a first search range with reference to position of the priority face on the fourth input image and searches, within the first search range, for the priority face on the fifth input image,
    the re-choice portion sets, in the third input image, a second search range with reference to position of the priority face on the first input image and searches, within the second search range, the to-be-re-chosen face on the third input image, and
    size of the second search range is larger than size of the first search range.

3. The image shooting device according to claim 2, wherein
    the re-choice portion inhibits a face other than the priority face detected from the first input image from being searched for as the to-be-re-chosen face.

4. The image shooting device according to claim 3, wherein
    the identification portion performs identification of faces detected by the face detection portion on a face-by-face basis based on position information of temporally consecutive input images including an input image of interest,
    through the identification, checking is performed as to whether a face detected from the input image of interest is a face newly detected in the input image of interest or a face that has been detected in an input image previous to the input image of interest, and
    the re-choice portion performs the re-choice processing based on a result of the checking such that, of faces detected from the second search range on the third input image by the face detection portion, a face that was not detected from the second input image but that was newly detected in the third input image is searched for as the to-be-re-chosen face.

5. The image shooting device according to claim 2, further comprising:
    a movement detection portion that detects movement of a priority face between different input images,
    wherein the re-choice portion varies a shape of the second search range according to movement of the priority face during a period in which the priority face was being detected by the identification portion.

6. The image shooting device according to claim 1, wherein
    the retained information includes additional information representing a feature of the priority face on the first input image, and
    the re-choice portion performs the re-choice processing based not only on position information of the priority face but on the additional information.

* * * * *